United States Patent
Fertonani et al.

(10) Patent No.: US 11,985,615 B2
(45) Date of Patent: May 14, 2024

(54) SYNCHRONIZATION OF RADIO UNITS IN RADIO ACCESS NETWORKS

(71) Applicant: CommScope Technologies LLC, Hickory, NC (US)

(72) Inventors: Dario Fertonani, La Jolla, CA (US); Alan Barbieri, La Jolla, CA (US)

(73) Assignee: CommScope Technologies LLC, Claremont, NC (US)

( * ) Notice: Subject to any disclaimer, the term of this patent is extended or adjusted under 35 U.S.C. 154(b) by 0 days.

(21) Appl. No.: 16/217,215

(22) Filed: Dec. 12, 2018

(65) Prior Publication Data

US 2019/0116568 A1 Apr. 18, 2019

Related U.S. Application Data

(63) Continuation of application No. PCT/US2017/042359, filed on Jul. 17, 2017.
(Continued)

(51) Int. Cl.
*H04W 56/00* (2009.01)
*H04W 88/08* (2009.01)

(52) U.S. Cl.
CPC ....... *H04W 56/0015* (2013.01); *H04W 56/00* (2013.01); *H04W 88/085* (2013.01); *H04W 88/08* (2013.01)

(58) Field of Classification Search
CPC ............................ H04W 56/00; H04W 88/085
See application file for complete search history.

(56) References Cited

U.S. PATENT DOCUMENTS

| | | | |
|---|---|---|---|
| 998,310 | A | 7/1911 | Wappler |
| 5,872,774 | A | 2/1999 | Wheatley, III et al. |

(Continued)

FOREIGN PATENT DOCUMENTS

| | | |
|---|---|---|
| EP | 2512202 B1 | 11/2013 |
| EP | 3051861 A1 | 8/2016 |

(Continued)

OTHER PUBLICATIONS

Yuan, J. Huang, S. Ma, C. Cui, and R. Duan, "Rethink fronthaul for soft RAN," Communications Magazine, IEEE, vol. 53, No. 9, pp. 82-88, Sep. 2015.*

(Continued)

*Primary Examiner* — Rhonda L Murphy
(74) *Attorney, Agent, or Firm* — Fogg & Powers LLC

(57) ABSTRACT

A distributed radio frequency communication system facilitates communication between wireless terminals and a core network. The system includes a group of remote radio units (RRUs). Each RRU of the group of RRUs is coupled to an antenna to communicate with at least some of the mobile terminals and includes electronic circuitry to perform at least a first portion of a first-level protocol of a radio access network (RAN) and communicate over a fronthaul link. The system also includes a baseband unit (BBU) coupled to the core network and the fronthaul link, and communicably coupled to the group of RRUs over the fronthaul link. The RRU receives a synchronization-assisting radio-frequency signal and sends information derived from that signal to the BBU. The BBU processes the information to determine synchronization instructions which are then used to adjust a local clock in the RRU.

29 Claims, 7 Drawing Sheets

Related U.S. Application Data

(60) Provisional application No. 62/363,781, filed on Jul. 18, 2016.

(56) References Cited

U.S. PATENT DOCUMENTS

| | | |
|---|---|---|
| 6,590,881 B1 | 7/2003 | Wallace et al. |
| 6,621,813 B2 | 9/2003 | Petch et al. |
| 6,745,012 B1 | 6/2004 | Ton |
| 6,963,552 B2 | 11/2005 | Sabat, Jr. et al. |
| 7,200,391 B2 | 4/2007 | Chung et al. |
| 7,398,106 B2 | 7/2008 | Conyers et al. |
| 7,474,891 B2 | 1/2009 | Toms et al. |
| 7,558,356 B2 | 7/2009 | Pollman et al. |
| 7,640,019 B2 | 12/2009 | Conyers et al. |
| 7,787,854 B2 | 8/2010 | Conyers et al. |
| 8,050,296 B2 | 11/2011 | Osterling |
| 8,379,625 B2 | 2/2013 | Humblet |
| 8,520,659 B2 | 8/2013 | Humblet |
| 8,682,338 B2 | 3/2014 | Lemson et al. |
| 8,737,454 B2 | 5/2014 | Wala et al. |
| 8,762,510 B2 | 6/2014 | Sabat, Jr. et al. |
| 8,780,802 B2 | 7/2014 | Wu et al. |
| 8,817,848 B2 | 8/2014 | Lemson et al. |
| 8,855,036 B2 | 10/2014 | Sabat et al. |
| 8,908,650 B2 | 12/2014 | Aarflot et al. |
| RE45,321 E | 1/2015 | Fischer et al. |
| 8,929,288 B2 | 1/2015 | Stewart et al. |
| 8,937,904 B2 | 1/2015 | Machida |
| 8,964,641 B2 | 2/2015 | Dalela et al. |
| 9,059,778 B2 | 6/2015 | Ling |
| 9,179,321 B2 | 11/2015 | Hasarchi et al. |
| 9,301,198 B2 | 3/2016 | Li et al. |
| 9,313,827 B2 | 4/2016 | Ilyadis |
| 9,359,074 B2 | 6/2016 | Ganesh et al. |
| 9,380,466 B2 | 6/2016 | Eyuboglu et al. |
| 9,392,635 B2 | 7/2016 | Hahn et al. |
| 9,414,399 B2 | 8/2016 | Eyuboglu et al. |
| 9,712,343 B2 | 7/2017 | Dussmann et al. |
| 9,729,215 B2 | 8/2017 | Rahman et al. |
| 9,769,766 B2 | 9/2017 | Hejazi et al. |
| 9,820,171 B2 | 11/2017 | Lemson et al. |
| 9,847,816 B2 | 12/2017 | Zhuang et al. |
| 9,867,052 B2 | 1/2018 | Sabat et al. |
| 9,876,585 B2 | 1/2018 | Gage |
| 9,917,622 B2 | 3/2018 | Lange |
| 9,936,470 B2 | 4/2018 | Eyuboglu et al. |
| 9,973,939 B2 | 5/2018 | Ross |
| 9,998,310 B2 | 6/2018 | Barbieri et al. |
| 10,045,314 B2 | 8/2018 | Stapleton et al. |
| 10,057,916 B2 | 8/2018 | Barabell et al. |
| 10,064,019 B2 | 8/2018 | Gustafson et al. |
| 10,070,432 B1 | 9/2018 | Luo et al. |
| 10,080,178 B2 | 9/2018 | Stapleton et al. |
| 10,084,537 B2 | 9/2018 | Stephens et al. |
| 10,097,391 B2 | 10/2018 | Fertonani et al. |
| 10,104,558 B2 | 10/2018 | Tarlazzi et al. |
| 10,116,376 B2 | 10/2018 | Weckerle et al. |
| 10,159,074 B2 | 12/2018 | Lemson et al. |
| 10,231,256 B2 | 3/2019 | Checko |
| 10,244,507 B2 | 3/2019 | Tarlazzi et al. |
| 10,313,917 B2 | 6/2019 | Halabian et al. |
| 10,334,499 B2 | 6/2019 | Stapleton et al. |
| 10,341,880 B2 | 7/2019 | Lange et al. |
| 10,355,895 B2 | 7/2019 | Barbieri et al. |
| 10,383,024 B2 | 8/2019 | Imana |
| 10,499,388 B2 | 12/2019 | Tarlazzi |
| 10,531,351 B2 | 1/2020 | Li et al. |
| 10,608,734 B2 * | 3/2020 | Barbieri ............ H04B 7/15507 |
| 10,616,016 B2 | 4/2020 | Fertonani et al. |
| 10,638,266 B2 | 4/2020 | Huang et al. |
| 10,749,721 B2 | 8/2020 | Barbieri et al. |
| 10,764,846 B2 | 9/2020 | Eyuboglu et al. |
| 10,785,791 B1 | 9/2020 | Eyuboglu |
| 11,528,640 B2 | 12/2022 | Na et al. |
| 2002/0118669 A1 | 8/2002 | Kauhanen |
| 2002/0196749 A1 | 12/2002 | Eyuboglu et al. |
| 2005/0286507 A1 | 12/2005 | Osterling et al. |
| 2007/0177552 A1 * | 8/2007 | Wu ..................... H04W 88/08 370/335 |
| 2008/0181171 A1 | 7/2008 | Koziy et al. |
| 2008/0286507 A1 | 11/2008 | Smithson et al. |
| 2012/0113972 A1 | 5/2012 | Liu et al. |
| 2012/0157089 A1 | 6/2012 | Yang et al. |
| 2012/0163299 A1 | 6/2012 | Chen et al. |
| 2012/0207206 A1 | 8/2012 | Samardzija et al. |
| 2012/0250740 A1 | 10/2012 | Ling |
| 2012/0300710 A1 | 11/2012 | Li et al. |
| 2013/0100907 A1 | 4/2013 | Liu |
| 2013/0128810 A1 | 5/2013 | Lee et al. |
| 2013/0279452 A1 | 10/2013 | Liu |
| 2013/0322273 A1 | 12/2013 | Etemad et al. |
| 2013/0324076 A1 | 12/2013 | Harrang |
| 2013/0329633 A1 | 12/2013 | Dalela et al. |
| 2014/0029431 A1 | 1/2014 | Haberland et al. |
| 2014/0031049 A1 | 1/2014 | Sundaresan et al. |
| 2014/0036770 A1 | 2/2014 | Stapleton et al. |
| 2014/0146905 A1 | 5/2014 | Zavadsky et al. |
| 2014/0146906 A1 | 5/2014 | Zavadsky et al. |
| 2014/0171063 A1 | 6/2014 | Mori |
| 2014/0185601 A1 | 7/2014 | Ilyadis |
| 2014/0201383 A1 | 7/2014 | Kuehnel et al. |
| 2014/0213249 A1 | 7/2014 | Kang et al. |
| 2014/0226481 A1 | 8/2014 | Dahod et al. |
| 2014/0226736 A1 | 8/2014 | Niu et al. |
| 2014/0241224 A1 | 8/2014 | Fischer et al. |
| 2014/0241315 A1 | 8/2014 | Niu et al. |
| 2014/0255034 A1 | 9/2014 | Huo |
| 2014/0286165 A1 | 9/2014 | Chowdhury et al. |
| 2014/0286239 A1 | 9/2014 | Chowdhury et al. |
| 2014/0286256 A1 | 9/2014 | Chowdhury et al. |
| 2014/0286258 A1 | 9/2014 | Chowdhury et al. |
| 2014/0293784 A1 | 10/2014 | Haberland |
| 2014/0301288 A1 | 10/2014 | Koc et al. |
| 2014/0303814 A1 | 10/2014 | Burema et al. |
| 2014/0349667 A1 | 11/2014 | Hahn et al. |
| 2014/0362801 A1 | 12/2014 | Morita |
| 2014/0378047 A1 | 12/2014 | Kennard |
| 2015/0117470 A1 | 4/2015 | Ryan et al. |
| 2015/0163772 A1 | 6/2015 | Ni et al. |
| 2015/0189692 A1 | 7/2015 | Portolan et al. |
| 2015/0215044 A1 | 7/2015 | Cvijetic et al. |
| 2015/0229372 A1 | 8/2015 | Perlman et al. |
| 2015/0229397 A1 | 8/2015 | Shibata et al. |
| 2015/0230287 A1 | 8/2015 | Moon et al. |
| 2015/0303950 A1 | 10/2015 | Shattil |
| 2015/0341941 A1 | 11/2015 | Nguyen |
| 2015/0365934 A1 | 12/2015 | Liu et al. |
| 2015/0372728 A1 | 12/2015 | Rahman et al. |
| 2015/0381217 A1 | 12/2015 | Kim et al. |
| 2016/0026996 A1 | 1/2016 | Jain |
| 2016/0080027 A1 | 3/2016 | Agata et al. |
| 2016/0128085 A1 | 5/2016 | Liu et al. |
| 2016/0143016 A1 | 5/2016 | Chanclou et al. |
| 2016/0165521 A1 | 6/2016 | Choi et al. |
| 2016/0183248 A1 | 6/2016 | Niu et al. |
| 2016/0192181 A1 * | 6/2016 | Choi ..................... H04B 7/26 455/422.1 |
| 2016/0212747 A1 | 7/2016 | Effenberger et al. |
| 2016/0242147 A1 | 8/2016 | Tarlazzi et al. |
| 2016/0255613 A1 | 9/2016 | Faerber et al. |
| 2016/0269961 A1 | 9/2016 | Imana |
| 2016/0270006 A1 | 9/2016 | Choi et al. |
| 2016/0323067 A1 | 11/2016 | Jana et al. |
| 2016/0352002 A1 * | 12/2016 | Aue ..................... H04B 7/0617 |
| 2017/0012833 A1 | 1/2017 | Kumar et al. |
| 2017/0064661 A1 | 3/2017 | Katagiri et al. |
| 2017/0164215 A1 | 6/2017 | Chen et al. |
| 2017/0238361 A1 | 8/2017 | Pawar et al. |
| 2017/0250927 A1 | 8/2017 | Stapleton et al. |
| 2017/0257840 A1 * | 9/2017 | Wang ..................... H04W 4/029 |
| 2017/0288695 A1 | 10/2017 | Feng et al. |
| 2017/0373890 A1 | 12/2017 | Fertonani et al. |
| 2018/0000736 A1 | 1/2018 | Martin et al. |
| 2018/0007736 A1 | 1/2018 | Ruttik et al. |

(56) References Cited

U.S. PATENT DOCUMENTS

| | | |
|---|---|---|
| 2018/0013581 A1 | 1/2018 | Fertonani et al. |
| 2018/0013597 A1 | 1/2018 | Barbieri et al. |
| 2018/0034669 A1 | 2/2018 | Barbieri et al. |
| 2018/0041327 A1 | 2/2018 | Wolff et al. |
| 2018/0042003 A1 | 2/2018 | Chen et al. |
| 2018/0049270 A1 | 2/2018 | Kubota et al. |
| 2018/0063847 A1 | 3/2018 | Huang et al. |
| 2018/0167889 A1 | 6/2018 | Rajagopal et al. |
| 2018/0184344 A1 | 6/2018 | Periyasamy et al. |
| 2018/0227028 A1 | 8/2018 | Lee |
| 2018/0234875 A1 | 8/2018 | Leroudier |
| 2018/0248787 A1 | 8/2018 | Rajagopal et al. |
| 2018/0249375 A1 | 8/2018 | Goldhamer |
| 2018/0270875 A1 | 9/2018 | Hampel et al. |
| 2018/0279143 A1 | 9/2018 | Bhattad et al. |
| 2018/0287696 A1 | 10/2018 | Barbieri et al. |
| 2018/0316395 A1 | 11/2018 | Sundararajan et al. |
| 2018/0359770 A1 | 12/2018 | Huang et al. |
| 2019/0007246 A1 | 1/2019 | Fertonani et al. |
| 2019/0007954 A1 | 1/2019 | Mach et al. |
| 2019/0059039 A1 | 2/2019 | Centonza et al. |
| 2019/0166593 A1 | 5/2019 | Liao et al. |
| 2019/0191398 A1* | 6/2019 | Ruffini ............... H04W 56/002 |
| 2019/0200373 A1 | 6/2019 | Becvar et al. |
| 2019/0208575 A1 | 7/2019 | Barbieri et al. |
| 2019/0245720 A1 | 8/2019 | Wang et al. |
| 2020/0084808 A1 | 3/2020 | Oak et al. |
| 2020/0204252 A1 | 6/2020 | Barbieri et al. |
| 2020/0235788 A1 | 7/2020 | Rajagopal et al. |
| 2020/0236592 A1 | 7/2020 | Berg et al. |
| 2020/0266864 A1 | 8/2020 | Lee |
| 2020/0287608 A1 | 9/2020 | Trojer et al. |
| 2021/0282101 A1 | 9/2021 | Fertonani et al. |

FOREIGN PATENT DOCUMENTS

| | | |
|---|---|---|
| EP | 2632072 B1 | 11/2016 |
| EP | 3158824 B1 | 3/2018 |
| WO | 9824256 A2 | 6/1998 |
| WO | 2010139112 A1 | 12/2010 |
| WO | 2014018864 A1 | 1/2014 |
| WO | 2014076004 A2 | 5/2014 |
| WO | 2014076004 A3 | 7/2014 |
| WO | 2014110730 A1 | 7/2014 |
| WO | 2015004507 A1 | 1/2015 |
| WO | 2015037857 A1 | 3/2015 |
| WO | 2015044871 A1 | 4/2015 |
| WO | 2015060562 A1 | 4/2015 |
| WO | 2015100589 A1 | 7/2015 |
| WO | 2016113469 A1 | 7/2016 |
| WO | 2016145371 A2 | 9/2016 |
| WO | 2016145371 A3 | 9/2016 |
| WO | 2017070635 A1 | 4/2017 |
| WO | 2017077361 A1 | 5/2017 |
| WO | 2017152982 A1 | 9/2017 |
| WO | 2017174111 A1 | 10/2017 |
| WO | 2018017468 A1 | 1/2018 |
| WO | 2018030508 A1 | 2/2018 |

OTHER PUBLICATIONS

Aleksandra Checko et al., 'Cloud RAN for Mobile Networks—A Technology Overview', IEEE Communications Surveys & Tutorials, pp. 1-24, Jan. 2015.
Barbieri and Fertonani, Distributed Radio Access Network With Adaptive Fronthaul, Unpublished U.S. Appl. No. 15/549,381, filed Aug. 8, 2017.
Choi, et al., Full-Duplex Wireless Design, Jul. 14, 2014, retrieved from http://sing.stanford.edu/fullduplex/ on Jul. 9, 2017.
Common Public Radio Interface (CPRI); Interface Specification, V7.0, Oct. 9, 2015, retrieved from http://www.cpri.info/downloads/CPRI_v_7_0_2015-10-09.pdf on Feb. 23, 2015.
Common Public Radio Interface, Mar. 11, 2015, retrieved from http://www.ieee802.org/1/files/public/docs2015/liaison-CPRI_Tdoc_1124_presentation-0315.pdf on Feb. 25, 2015.
European Patent Office, Supplemental Search Report for related application EP 1676243.1, dated Aug. 16, 2018.
Fertonani and Barbieri, Remote Radio Unit with Adaptive Fronthaul Link for a Distributed Radio Access Network, Unpublished U.S. Appl. No. 15/701,315, filed Sep. 11, 2017.
Haijun Zhang et al., 'Cooperative Interference Mitigation and Handover Management for Heterogeneous Cloud Small Cell Networks', In: IEEE Wireless Communications, Jul. 6, 2015, vol. 22, Issue 3, pp. 92-99.
J. J. van de Beek, M. Sandell and P. O. Borjesson, ML estimation of time and frequency offset in OFDM systems, IEEE Transactions on Signal Processing, vol. 45, No. 7, pp. 1800-1805, Jul. 1997.
Korean Intellectual Property Office, International Search Report for PCT/US2016/022114, dated Nov. 17, 2016.
Korean Intellectual Property Office, International Search Report for PCT/US2016/058351, dated Apr. 11, 2017.
Korean Intellectual Property Office, Written Opinion of the International Searching Authority for PCT/US2016/022114, dated Nov. 17, 2016.
Korean Intellectual Property Office, Written Opinion of the International Searching Authority for PCT/US2016/058351, dated Apr. 11, 2017.
Liang Liu et al., 'Optimized Uplink Transmission in Multi-Antenna C-RAN With Spatial Compression and Forward', In: IEEE Transactions on Signal Processing, Jun. 25, 2015, vol. 63, Issue 19, pp. 5083-5095.
LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12), Feb. 2015, retrieved from http://www.etsi.org/deliver/etsi_ts/136300_136399/136300/12.04.00_60/ts_136300v120400p.pdf on Mar. 2, 2016.
LTE; Evolved Universal Terrestrial Radio Access (E-UTRA); Medium Access Control (MAC) protocol specification (3GPP TS 36.321 version 12.4.0 Release 12); Feb. 2015, retrieved from http://www.etsi.org/deliver/etsi_ts/136300_136399/136321/12.04.00_60/ts_136321v120400p.pdf on Mar. 2, 2016.
LTE; Evolved Universal Terrestrial Radio Access (E-UTRA); Physical channels and modulation (3GPP TS 36.211 version 12.4.0 Release 12), Feb. 2015, retrieved from http://www.etsi.org/deliver/etsi_ts/136200_136299/136211/12.04.00_60/ts_136211v120400p.pdf on Mar. 5, 2016.
LTE; Evolved Universal Terrestrial Radio Access (E-UTRA);LTE physical layer; General description (3GPP TS 36.201 version 12.1.0 Release 12), Feb. 2015, retrieved from http://www.etsi.org/deliver/etsi_ts/136200_136299/136201/12.01.00_60/ts_136201v120100p.pdf on May 16, 2016.
M. Morelli and U. Mengali, Carrier-frequency estimation for transmissions over selective channels,IEEE Transactions on Communications, vol. 48, No. 9, pp. 1580-1589, Sep. 2000.
Mayank Jain et al. in "Practical, Real-time, Full Duplex Wireless" published in the Proceedings of the 17th Annual International Conference on Mobile Computing and Networking (Mobicom 2011), Sep. 19, 2011.
Milosavljevic, Milos, Combined optical and wireless/wireline access based on existing requirements, Version 1.0, Sep. 30, 2011, retrieved from http://cordis.europa.eu/docs/projects/cnect/4/248654/080/deliverables/001-AccordanceD53WP5201130SeptemberUHv10.pdf on Feb. 10, 2016.
NGMN Alliance, 'Further Study on Critical C-RAN Technologies', version 1.0, Mar. 31, 2015.
Nui et al., RAN architecture options and performance for 5G network evolution, 2014 IEEE Wireless Communications and Networking Conference Workshops (WCNCW) IEEE, Apr. 6, 2014, pp. 294-298.
Uwe et al., Quantitative Analysis of Split Base Station Processing and Determination of Advantageous Architectures for LTE, Bell Labs Technical Journal, vol. 18, No. 1, May 30, 2013, pp. 105-128.
Young, Bruce, Response Non-final Office Action for related U.S. Appl. No. 15/549,381 dated Mar. 6, 2019.

(56) References Cited

OTHER PUBLICATIONS

USPTO, Non-Final Office Action for related U.S. Appl. No. 15/701,315, dated Mar. 19, 2019.
USPTO, Non-Final Office Action for related U.S. Appl. No. 15/701,315, dated Jul. 17, 2019.
USPTO, Notice of Allowance for related U.S. Appl. No. 15/549,381 dated May 8, 2019.
Young, Bruce, Response/Amendment to Non-Final Office Action for related U.S. Appl. No. 15/701,315, dated Mar. 21, 2019.
European Patent Office, Examination Report for related case EP 16762643.1, dated Aug. 30, 2019.
USPTO, Final Office Action for related U.S. Appl. No. 15/701,315, dated Dec. 23, 2019.
USPTO, Non-final Office Action for related U.S. Appl. No. 15/549,381 dated Jan. 25, 2019.
Young, Bruce, Response Final Office Action for related U.S. Appl. No. 15/701,315, dated Jan. 20, 2020.
Young, Bruce, Response Non-final Office Action for related U.S. Appl. No. 15/701,315, dated Sep. 19, 2019.
Young, Bruce, Response/Amendment to Non-final Office Action for related U.S. Appl. No. 15/549,381 dated Mar. 6, 2019.
USPTO, Non-Final Office Action for related U.S. Appl. No. 16/122,687, dated Jan. 23, 2020.
USPTO, Non-Final Office Action for related U.S. Appl. No. 16/239,493, dated Apr. 8, 2020.
USPTO, Notice of Allowance for related U.S. Appl. No. 15/701,315, dated Feb. 10, 2020.
USPTO, Notice of Allowance for related U.S. Appl. No. 16/122,687, dated Jun. 2, 2020.
Young, Bruce, Response to Non-Final Office Action for related U.S. Appl. No. 16/239,493, dated Jun. 19, 2020.
Cpri, "A Successful Industry cooperation", http://www.cpri.info, at least as early as Feb. 10, 2016, pp. 1 through 4, www.cpri.info.
Cpri, "Common Public Radio Interface (CPRI); Interface Specification", CPRI Specification V6.1, Jul. 1, 2014, pp. 1 through 129.
European Patent Office, "Communication under Rule 71(3) from EP Application No. 16762643.1", from Foreign Counterpart to U.S. Appl. No. 15/549,381, Jul. 24, 2020, pp. 1 through 5, Published: EP.
European Patent Office, "Extended European Search Report from EP Application No. 16762643.1", from Foreign Counterpart to U.S. Appl. No. 15/549,381, Aug. 23, 2018, pp. 1 through 18, Published: EP.
Gray, "Quantization", IEEE Transactions on Information Theory, Oct. 1998, pp. 2325 through 2383, vol. 44, No. 6, IEEE.
International Bureau, "International Preliminary Report on Patentability from PCT Application No. PCT/ US2016/022114", from Foreign Counterpart to U.S. Appl. No. 15/549,381, Sep. 12, 2017, pp. 1 through 23, Published: WO.
International Bureau, "International Preliminary Report on Patentability from PCT Application No. PCT/ JS2017/042359", from Foreign Counterpart to U.S. Appl. No. 16/217,215, Jan. 22, 2019, pp. 1 through 7, Published: WO.
International Searching Authority, "International Search Report and Written Opinion from PCT Application No. PCT/US2017/042359", from Foreign Counterpart to U.S. Appl. No. 16/217,215, Oct. 30, 2017, pp. 1 through 9, Published: WO.
Nieman et al., "Time-Domain Compression of Complex-Baseband LTE Signals for Cloud Radio Access Networks", EEE Global Conference on Signal and Information Processing, 2013, pp. 1 through 4.
Saifur et al., "Methods and Apparatus for Ofdm Signal Compression", U.S. Appl. No. 62/015,884, filed Jun. 23, 2014, pp. 1 through 40, Published: US.
Saifur et al., "Methods and Apparatus for Ofdm Signal Compression", U.S. Appl. No. 62/094,780, Dec. 19, 2014, pp. 1 through 46, Published: US.
Samardzija et al., "Compressed Transport of Baseband Signals in Radio Access Networks", IEEE Transactions on Wireless Communications, 2012, pp. 1 through 10, IEEE.
Samplify, "Compression of Wireless Signals: Prism IQ", Nov. 2, 2011, pp. 1 through 2, Samplify Systems.
Samplify, "General Purpose Signal Compression: Prism 3.0", Nov. 2, 2011, pp. 1 through 2, Samplify Systems.
Samplify, "Prism Compression", Jan. 1, 2012, pp. 1 through 2, Samplify Systems.
Small Cell Forum, "Document 082.09.04 FAPI and nFAPI specifications", Small Cell Forum Release 9.0, Feb. 2017, pp. 1 through 283, www.scf.io.
U.S. Patent and Trademark Office, "Corrected Notice of Allowability", U.S. Appl. No. 15/765,254, Feb. 27, 2020, pp. 1 through 6, Published: US.
U.S. Patent and Trademark Office, "Final Office Action", U.S. Appl. No. 15/701,290, Mar. 15, 2018, pp. 1 through 17, Published: US.
U.S. Patent and Trademark Office, "Final Office Action", U.S. Appl. No. 15/765,254, Dec. 4, 2019, pp. 1 through 21, Published: US.
U.S. Patent and Trademark Office, "Notice of Allowance", U.S. Appl. No. 15/701,290, Apr. 24, 2018, pp. 1 through 5, Published: US.
U.S. Patent and Trademark Office, "Notice of Allowance", U.S. Appl. No. 15/701,362, Aug. 28, 2018, pp. 1 through 41, Published: US.
U.S. Patent and Trademark Office, "Notice of Allowance", U.S. Appl. No. 15/765,254, filed Jan. 14, 2020, pp. 1 through 12, Published: US.
U.S. Patent and Trademark Office, "Office Action", U.S. Appl. No. 15/701,290, filed Nov. 14, 2017, pp. 1 through 23, Published: US.
U.S. Patent and Trademark Office, "Office Action", U.S. Appl. No. 15/765,254, filed Jul. 25, 2019, pp. 1 through 41, Published: US.
U.S. Patent and Trademark Office, "Restriction Requirement", U.S. Appl. No. 15/701,362, filed Jun. 28, 2018, Page (s) 1 through 5, Published: US.
U.S. Patent and Trademark Office, "Supplemental Notice of Allowability", U.S. Appl. No. 15/765,254, filed Jan. 31, 2020, pp. 1 through 10, Published: US.
Young, "Response Non-final Office Action for related applications #U.S. Appl. No. 15/701,362", Jun. 30, 2018, pp. 1 through 10.
Young, "Response to Final Office Action for related U.S. Appl. No. 16/122,687", Apr. 23, 2020, pp. 1 through 14.
Young, "Response/Amendment to Final Office Action for related US Patent Application #U.S. Appl. No. 15/701,290", Mar. 22, 2018, pp. 1 through 8.
Young, "Response/Amendment to Non-Final Office Action for related US Patent Application #U.S. Appl. No. 15/701,290", Feb. 12, 2018, pp. 1 through 12.
Zhu et al., "Virtual Base Station Pool: Towards A Wirless Network Cloud for Radio Access Networks", CF' 10, May 2010, pp. 1 through 10, Bertinoro, Italy.
Haberland et al. "Base Stations in the Cloud", ITG Fachtagung Wien, Sep. 28, 2012, pp. 1 through 23, Alcatel- Lucent.
USPTO, Final Office Action for related U.S. Appl. No. 16/239,493, Sep. 21, 2020.
European Patent Office, "Extended European Search Report from EP Application No. 20216637.7", from Foreign Counterpart to U.S. Appl. No. 15/549,381, May 12, 2021, pp. 1 through 15, Published: EP.
Lorca et al., "Lossless Compression Technique for the Fronthaul of LTE/LTE-Advanced Cloud-RAN Architectures", 2013 IEEE 14th International Symposium on A World of Wireless, Mobile and Multimedia Networks (WOWMOM), Jun. 4, 2013, pp. 1 through 9, IEEE.
U.S. Patent and Trademark Office, "Notice of Allowance", U.S. Appl. No. 16/239,493, Jan. 22, 2021, pp. 1 through 17, Published: US.
U.S. Patent and Trademark Office, "Office Action", U.S. Appl. No. 16/506,574, Mar. 3, 2021, pp. 1 through 52, Published: US.
U.S. Patent and Trademark Office, "Notice of Allowance", U.S. Appl. No. 16/239,493, Apr. 28, 2021, pp. 1 through 9, Published: US.
U.S. Patent and Trademark Office, "Notice of Allowance", U.S. Appl. No. 16/239,493, Dec. 3, 2021, pp. 1 through 9, Published: US.

(56) References Cited

OTHER PUBLICATIONS

U.S. Patent and Trademark Office, "Notice of Allowance", U.S. Appl. No. 16/806,574, Feb. 2, 2022, pp. 1 through 20, Published: US.

U.S. Patent and Trademark Office, "Notice of Allowance", U.S. Appl. No. 16/239,493, Jul. 19, 2022, pp. 1 through 9, Published: US.

U.S. Patent and Trademark Office, "Notice of Allowance", U.S. Appl. No. 16/239,493, Mar. 22, 2022, pp. 1 through 15, Published: US.

U.S. Patent and Trademark Office, "Notice of Allowance", U.S. Appl. No. 16/806,574, May 18, 2022, pp. 1 through 11, Published: US.

U.S. Patent and Trademark Office, "Office Action", U.S. Appl. No. 16/985,666, Mar. 15, 2022, pp. 1 through 67, Published: US.

U.S. Patent and Trademark Office, "Notice of Allowance", U.S. Appl. No. 16/985,666, Aug. 31, 2022, pp. 1 through 14, Published: US.

U.S. Patent and Trademark Office, "Notice of Allowance", U.S. Appl. No. 16/806,574, Sep. 23, 2022, pp. 1 through 12, Published: US.

U.S. Patent and Trademark Office, "Notice of Allowance", U.S. Appl. No. 16/239,493, Oct. 28, 2022, pp. 1 through 10, Published: US.

U.S. Patent and Trademark Office, "Notice of Allowance", U.S. Appl. No. 16/985,666, Dec. 13, 2022, pp. 1 through 10, Published: US.

U.S. Patent and Trademark Office, "Notice of Allowance", U.S. Appl. No. 16/239,493, Jun. 22, 2023, pp. 1 through 11, Published: US.

European Patent Office, "Communication pursuant to Article 71(3) EPC", from EP Application No. 20216637.7, from Foreign Counterpart to U.S. Appl. No. 16/239,493, Apr. 14, 2023, pp. 1 through 119, Published: EP.

U.S. Patent and Trademark Office, "Notice of Allowance", U.S. Appl. No. 16/985,666, Jul. 10, 2023, pp. 1 through 10, Published: US.

U.S. Patent and Trademark Office, "Notice of Allowance", U.S. Appl. No. 16/239,493, Feb. 15, 2023, pp. 1 through 9, Published: US.

U.S. Patent and Trademark Office, "Notice of Allowance", U.S. Appl. No. 16/806,574, Feb. 28, 2023, pp. 1 through 11, Published: US.

U.S. Patent and Trademark Office, "Notice of Allowance", U.S. Appl. No. 16/985,666, Mar. 28, 2023, pp. 1 through 10, Published: US.

U.S. Patent and Trademark Office, "Notice of Allowance", U.S. Appl. No. 16/806,574, Jul. 13, 2023, pp. 1 through 17, Published: US.

U.S. Patent and Trademark Office, "Office Action", U.S. Appl. No. 17/328,648, Aug. 31, 2023, pp. 1 through 82, Published: US.

U.S. Patent and Trademark Office, "Office Action", U.S. Appl. No. 17/328,648, dated Mar. 14, 2024, pp. 1 through 22, Published: US.

* cited by examiner

SYNCHRONIZATION OF RADIO UNITS IN RADIO ACCESS NETWORKS

CROSS-REFERENCE TO RELATED APPLICATIONS

The present application is a continuation of International Patent Application No. PCT/US2017/042359, entitled SYNCHRONIZATION OF RADIO UNITS IN RADIO ACCESS NETWORKS, filed on Jul. 17, 2017, which claims priority to U.S. Provisional Patent Application No. 62/363,781, entitled Synchronization Methods for Radio Units in Radio Access Networks, filed on Jul. 18, 2016. The present application is related to International Patent Application No. PCT/US2016/058351, entitled VIRTUALIZATION AND ORCHESTRATION OF A RADIO ACCESS NETWORK, filed on Oct. 23, 2016, which claims priority to U.S. Provisional Patent Application No. 62/245,113, entitled Methods for IP-based fronthaul in virtualized Radio Access Network, filed on Oct. 22, 2015, and to U.S. Provisional Patent Application No. 62/297,111, entitled Virtualization and Orchestration Methods for Radio-as-a-Service, filed on Feb. 18, 2016. The present application is also related to International Patent Application No. PCT/US2016/022114, entitled DISTRIBUTED RADIO ACCESS NETWORK WITH ADAPTIVE FRONTHAUL, filed on Mar. 11, 2016, which claims priority to U.S. Provisional Patent Application No. 62/131,337, entitled Methods for Radio-as-a-Service, filed on Mar. 11, 2015. The entire contents of all seven afore-mentioned applications are hereby incorporated by reference herein for any and all purposes.

BACKGROUND

Technical Field

The present subject matter relates to wireless communications. More specifically, the present subject matter relates to a distributed radio access network (RAN).

Background Art

As cellphones have become nearly ubiquitous over the last few years, and smartphones have become the primary type of cellphone used in many countries, the data traffic generated by smartphones has increased dramatically. This increase in cellular data traffic has not been matched by a proportional increase of the available radio spectrum. Radio spectrum is a fixed resource, so making any additional frequency bands available for cellphones, or other mobile terminals, comes at the expense of other uses. This makes it very difficult to accomplish; therefore, efficient use of the existing spectrum is very important. As such, management of the precious spectrum has become very complex. Hence, network deployment and maintenance are expensive, lengthy, and error-prone processes.

A Radio Access Network (RAN) provides access to a core network for a mobile terminal, such as a smartphone. RANs have progressed through several different generations of technology, and are sometimes referred to by a so-called "generation number," such as 3G, or 4G networks. An example 2G RAN is the GSM (Global System for Mobile Communications) Radio Access Network (GRAN), example 3G RANs include the GSM EDGE Radio Access Network (GERAN), and the Universal Mobile Telecommunications System (UMTS). An example 4G network is the Long-Term Evolution Advanced (LTE-A) which is also known as the Evolved Universal Terrestrial Radio Access Network (E-UTRAN) and may also be referred to simply as "LTE" herein. Each RAN communicates with mobile terminals using radio frequency communication protocols defined by the RAN at frequencies supported by the RAN and licensed by a particular communications company, or carrier. The frequencies are modulated using a variety of techniques, depending on the RAN, to carry digital information that can be used for voice transmission and/or data transfer.

Each RAN can define its own software structure, but many generally conform to the 7-layer Open Systems Interconnection (OSI) model. The seven layers include a lowest layer, layer 1, which is commonly referred to as the physical layer or PHY, which describes the transmission and reception of raw bit streams over a physical medium. The next layer, layer 2, is known as the data link layer, but often is referred to by the name of a protocol that resides at that layer, such as the medium access protocol (MAC), or point-to-point protocol (PPP), which provide for transmission of data frames between two nodes connected by a physical layer. The third layer, known as the network layer, manages a multi-node network and handles such issues as addressing, to send packets of data between nodes. The internet protocol (IP) is a commonly used network layer protocol. The next layer, layer 4, is known as the transport layer. Common transport protocols include the transmission control protocol (TCP) and the user datagram protocol (UDP). Transport protocols manage transmission of data segments between nodes of the network. Layer 5, the session layer, manages communication sessions, layer 6, the presentation layer, translates data between a networking service and an application, and the top layer, layer 7 or the application layer, provides high-level application programming interfaces (APIs) for network related services.

More details of an E-UTRAN are provided as an example. The specifications for E-UTRAN are developed and published by the $3^{rd}$ Generation Partnership Project (3GPP). The specifications related to E-UTRAN are known as the 36 series specifications and are available for download from the 3GPP website at http://www.3gpp.org/DynaReport/36-series.htm. Several of the specifications include information helpful in understanding this disclosure, including: "LTE; Evolved Universal Terrestrial Radio Access (E-UTRA); LTE physical layer; General description," 3GPP TS 36.201 version 12.1.0 Release 12, 2015-02; "LTE; Evolved Universal Terrestrial Radio Access (E-UTRA); Physical channels and modulation," 3GPP TS 36.211 version 12.4.0 Release 12, 2015-02; "LTE; Evolved Universal Terrestrial Radio Access (E-UTRA) and Evolved Universal Terrestrial Radio Access Network (E-UTRAN); Overall description; Stage 2," 3GPP TS 36.300 version 12.4.0 Release 12, 2015-02; and "LTE; Evolved Universal Terrestrial Radio Access (E-UTRA); Medium Access Control (MAC) protocol specification," 3GPP TS 36.321 version 12.4.0 Release 12, 2015-02; all four of which are incorporated by reference herein.

In an E-UTRAN, a base station is known as an enhanced node B (eNB) and a mobile terminal is known as user equipment (UE). An eNB can manage one or more cells, also called sectors, and is responsible for transmission and reception of wireless signals as well as interfacing with the core network, known as evolved packet core (EPC). It provides connectivity, that is, reliable data transfer (whenever possible), and control paths to the UEs in its coverage area. An eNB communicates with a UE using a pair of carrier frequencies, one for uplink (UL) and one for downlink (DL), if using Frequency Division Duplex (FDD), or using a single carrier frequency for both UL and DL if using Time Division Duplex (TDD). The DL uses Orthogonal Frequency Division Multiple Access (OFDMA) modulation of the carrier, and the UL uses Single-Carrier Frequency Division Multiple Access (SC-FDMA), which is also known as Linearly Precoded OFDMA (LP-OFDMA). While the two modulation schemes are different, they share many similar qualities, and the term "OFDM" may generally be used herein to describe either scheme.

In a traditional implementation, eNBs are separate logical entities, connected to the same core network via the S1 interface, which can be conveyed over a wired or wireless backhaul connection. An optional X2 interface may be used to directly connect neighbor eNBs. During a call, a UE may be handed over to neighbor eNBs, depending on radio conditions and traffic load. Handovers imply, among other things, a transfer of "context" of the UE being handed over, from a source eNB to a destination eNB. Such transfer may occur via the S1 interface or via the X2 interface, if available. The functions of the eNB can be broadly classified as radio frequency (RF) functions that deal with radio frequency signals and baseband (BB) operations that deal with digital data.

An eNB implements several functions which together can be classified baseband (BB) operations. The baseband operations include the physical-layer (PHY) functions, medium access control (MAC) layer functions, radio link control (RLC) layer functions, packet data converge protocol (PDCP) layer functions, and radio resource control (RRC) layer functions.

Physical-layer (PHY) functions include, among others, transmission of downlink physical channels, such as physical downlink control channel (PDCCH), physical downlink shared channel (PDSCH), and cell-specific reference signal (CRS). The PHY layer functions also include reception of uplink physical layer channels, such as physical uplink shared channel (PUSCH), physical uplink control channel (PUCCH), physical random access channel (PRACH), and sounding reference signal (SRS). The PHY layer also handles synchronization, measurements of radio conditions, and other miscellaneous functions.

Medium access control (MAC) layer functions include scheduling, mapping of transport channels to logical channels, maintenance of uplink timing alignment, hybrid automatic repeat request (HARM) operation, and discontinuous reception (DRX). Radio link control (RLC) layer functions include concatenation, segmentation, reassembly, reordering, and error correction (through ARQ). Packet data convergence protocol (PDCP) layer functions include in-sequence delivery of data units, header compression, elimination of duplicates, ciphering and deciphering, and integrity protection and verification. Radio resource control (RRC) layer functions include broadcast of system information, connection control, mobility, and measurement configuration and control.

In a traditional implementation, all eNB functions are carried out by specialized hardware devices, dedicated telecommunications equipment, data centers, and the like. In such traditional systems, the entire eNB is located in one location, allowing the eNB to be managed as a single unit. In another implementation, one or more eNBs are managed by the same hardware device or co-located devices and the transmission and reception antennas corresponding to the eNBs are distributed in a potentially large region. In such implementation, groups of co-located antennas may be denoted as remote radio heads (RRHs), and a special interface connects the processing device with the RRHs it manages. An RRH can also be referred to as a remote radio unit (RRU), and the terms are used interchangeably herein.

In one implementation, which may be referred to as a distributed RAN or a Cloud-RAN, an RRH is targeted to have a smaller form factor, reduced power consumption, and lower operating expenses. To meet this goal, the RRH implements a minimum set of functions. In such implementations, the RRH may only include radio frequency (RF) functions such as amplification, filtering, up and down frequency conversion, digital to analog and analog to digital conversions, and the like, and baseband processing is still performed by dedicated equipment, which may not be co-located with the RRH.

A block diagram of a traditional distributed RAN 100 is shown in FIG. 1. The RAN 100 includes a central office 102 with one or more baseband units (BBUs) 160 that include all of the functionality for the PHY layer and the MAC layer of the RAN protocol. The RAN 100 also includes multiple RRUs 130 that include RF functionality and are each coupled to one or more antennas 131 to communicate with UE devices, such as smartphones. The interface between a BBU 160 and an RRH 130, is referred to as a fronthaul link 135. A traditional fronthaul link 135, can utilize a wired, optical, or radio frequency physical link, but the traditional fronthaul link is synchronous, low-jitter, and usually point-to-point. The fronthaul link 135 may be referred to as being "fiber-grade" indicating that it is high speed and low latency with minimal jitter. In some cases, the fronthaul link 135 uses a proprietary protocol, but in many implementations, a standardized protocol, such as the Common Public Radio Interface (CPRI) or the Open Base Station Architecture Initiative (OBSAI), is used. A central office 102 may host multiple BBUs 160, which in turn may control multiple RRUs 130. The BBUs 160 of the central office 102 are coupled to the core network, or EPC 199, by a backhaul link 190 that may utilize standard networking technology and is much more tolerant of latency and jitter issues than the fronthaul link 135.

One key issue with a distributed RAN 100 architecture is synchronization. Each RRU 130 needs to be synchronized with the other RRUs 130 so that they create a coordinated environment for the UEs. If a synchronous fronthaul link 135 is used, the clocks in the RRHs 130 and the BBUs 160 are kept synchronized through the synchronous nature of the fronthaul link. But even in such systems, synchronizing the RRHs 130 and BBUs 160 shown in FIG. 1 with other BBUs and RRHs of the RAN 100 may require additional resources. In some cases a carrier-grade global-positioning-system (GPS) receiver is included in each BBU or RRH to extract a highly accurate clock signal and each device is then locked to the that GPS clock so that they stay synchronized. This can add significant cost to a BBU, however. In addition, if a non-deterministic link is used for the fronthaul, there is no clock to use to keep the BBUs and RRHs synchronized, which is one reason why deterministic, synchronous links, such as CPRI over a fiber link, have traditionally been used for the fronthaul link in distributed RANs.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

Figure 1:
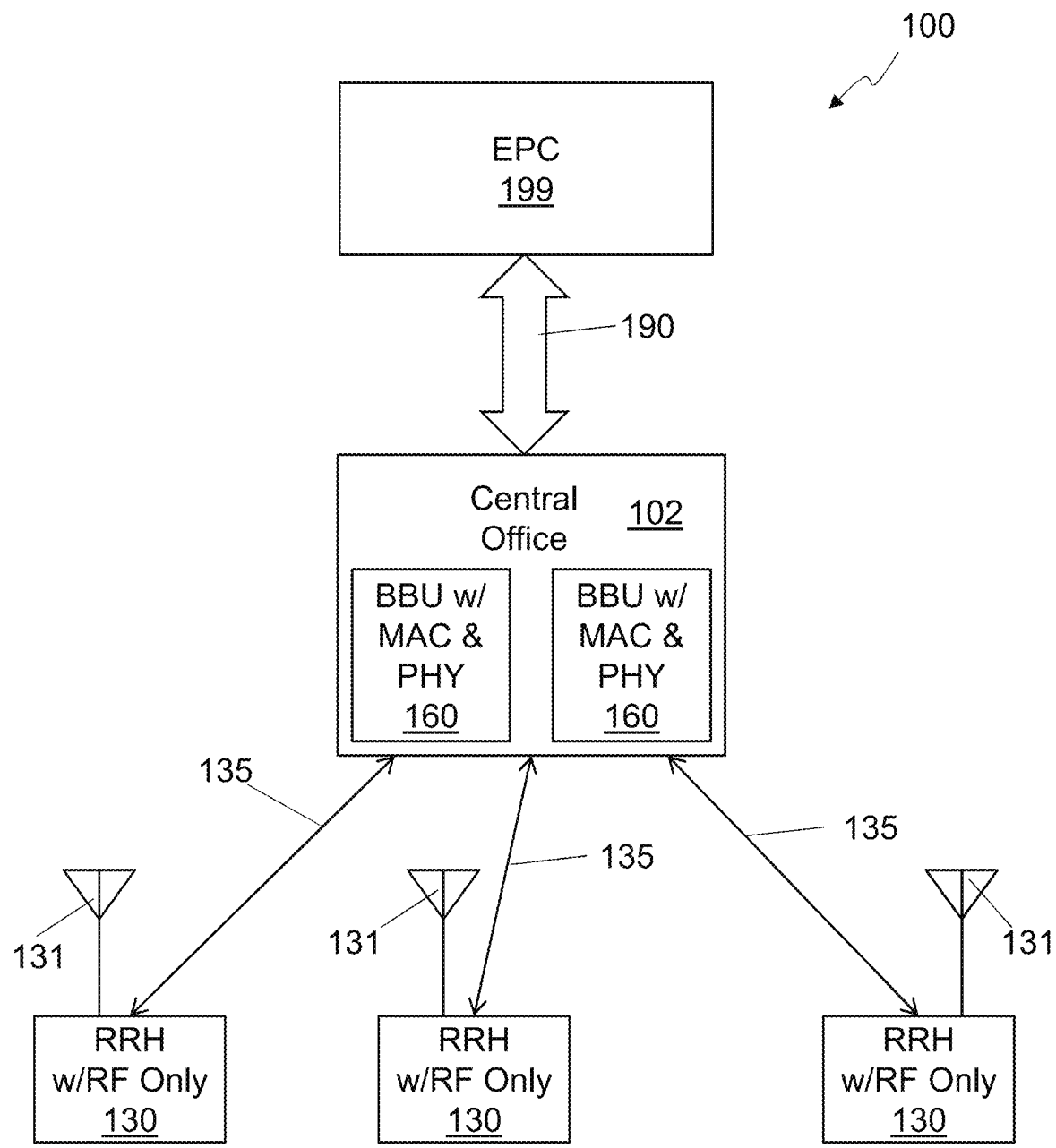
FIG. 1 is a block diagram of a traditional distributed radio access network (RAN)

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

A Baseband Unit (BBU) is a portion of a base station of a radio access network (RAN) that implements most, or all, of the OSI layer 2 functionality of the RAN and may include functionality of higher OSI network layers. The BBU may also be referred to as a virtual radio access network (vRAN), and the terms may be used interchangeably. In some embodiments, the BBU may include portions of the OSI layer 1 functionality of the RAN and a data connection to a remote radio unit (RRU).

A Remote Radio Unit (RRU), which can also be referred to as a remote radio head (RRH), is a portion of a base station of a RAN that includes a connection to couple to an antenna and transmitter and/or receiver circuitry, but does not include full OSI layer 2 functionality of the RAN, such as medium access control (MAC) functionality. An RRU also includes some or all of the OSI layer 1 functionality of the RAN and a data connection to a baseband unit (BBU).

A fronthaul link, or fronthaul connection, is the data connection used by a BBU and RRU to communicate with each other. Any sort of data communication mechanism can be used, depending on the embodiment, but in at least some embodiments, a network is used that is compatible with a standard published or maintained by The Institute of Electrical and Electronic Engineers (IEEE®) 802® working groups, such as a version of the IEEE 802.3 standard (i.e. Ethernet), a version of the IEEE 802.11 standard (i.e. Wi-Fi®), or a version of IEEE 802.16 (i.e. WiMAX®). If a network having a non-deterministic protocol, such as an internet protocol (IP) network, is used, an adaptive link protocol can be used by the BBU and RRU for communication over that link. Links which do not pass a clock from one end to the other, such as asynchronous links, are also considered to be non-deterministic. In other embodiments, the fronthaul link may be a dedicated fiber-grade link using common public radio interface (CPRI) or other deterministic protocol.

User Equipment (UE) refers to a device in wireless communication with the base station of the RAN. It may also be referred to as a mobile terminal, mobile device, wireless terminal, or a wireless device and the terms may be used interchangeably, even though some UE may not be mobile or may not be completely wireless (e.g. may have a wired power connection). Examples of UE include smartphones, tablets, mobile Wi-Fi hotspots, remote data collection units (e.g. weather stations), and connected automobiles.

Turning now to a description of the technology disclosed herein, a distributed radio access network (RAN) uses one or more baseband units (BBUs) coupled to one or more remote radio units (RRUs) over a fronthaul link. This system may be referred to as using Radio-as-a-Service™ (RaaS) technology or a RaaS system. The BBUs can be based on proprietary hardware or can be implemented using software on a computer server, although dedicated hardware acceleration added to the server may be used in some embodiments. The RRUs are typically built using custom hardware and include, or are coupled to, a radio frequency (RF) receiver, transmitter, or transceiver.

RaaS technology enables easy deployment and maintenance of RAN systems, including 4G networks, and clears the path to 5G networks. RRUs are simple and relatively inexpensive plug-and-play devices that allow RAN connectivity to be positioned wherever it is needed, and BBUs can be instantiated on commodity servers to implement the RAN software stack without any dedicated hardware in many cases. With such a virtual implementation of the radio stack, network updates and upgrades can be handled as software patches using well-established techniques for updating software. Thus, a RaaS architecture makes it straightforward to adopt advanced features such as LTE-U (LTE in unlicensed spectrum) or even 5G.

A BBU may run in the cloud, for example as a software instance running in a data center, using an adaptive fronthaul protocol over a standard IP-based network to communicate with one or more RRUs. The adaptive fronthaul protocol may be referred to as RaaS Fronthaul over IP (RaaS-FIP). RaaS-FIP may be used for the exchange of datagrams between a BBU and an RRU. Many different RAN architectures can be supported by a RaaS architecture including, but not limited to, LTE and LTE-A. In another implementation, at least one BBU may be connected to at least one RRU through a link that does not rely on IP and RaaS-FIP, such as through a dedicated link employing the common public radio interface (CPRI) protocol. Each BBU implements at least some portion of the networking stack of the RAN, including layer 2 and in some cases portions of layer 1. Higher level layers, may also be included in some embodiments of the BBU.

RaaS can virtualize the RAN stack by replacing dedicated, expensive, and bulky base stations with software running on general purpose x86 or ARM CPUs communicating with small, easily deployed RRUs. BBUs can be deployed in many different ways. In some cases a BBU can be a dedicated hardware unit, which may be based on commodity hardware, or as software installed on a standard computer, such as a rack-mounted server. A BBU may be positioned in traditional central office type installations. In such situations, an IP-based fronthaul link using RaaS-FIP may be used for communication between the BBU and RRU, but in some cases a non-IP-based fronthaul link, such as a fiber-grade communications link with a deterministic protocol like CPRI, may be used with dedicated hardware for the communications link included in the dedicated BBU hardware unit. In some cases, BBUs may be mobile, such as using BBUs instantiated on racks of commodity server mounted in a truck. But in many cases, BBUs are instantiated on servers based in data centers, and a standard IP-based network is used for communications with the RRUs. The data centers and servers may be owned by the carrier, or they may be owned by a third party that leases the computers to the carrier. In some cases, BBUs can be instantiated using a public computing cloud service such as those offered by Google Compute Engine™ (GCE) compute services or Amazon Web Services™ (AWS) compute services.

Positioning RRUs where they are needed allows a carrier to respond to changing customer demands. In a traditional RAN architecture, significant planning and manual configuration needs to take place to deploy a new set of base stations which are bulky and expensive. In a RaaS system, RRUs can be easily positioned where they are need and BBUs dynamically instantiated in a remote data center to support the RRUs as they are positioned. In fact, the RRUs can even be mobile, located on ground-based or aerial vehicles, and the RaaS system can dynamically respond to, or even control, the movement of the mobile RRUs to meet the ever-changing requirements of the mobile terminals in use. BBUs can also be mobile and dynamically associated with RRUs automatically. This can be useful in situations where mobile device usage may peak, such as at concerts and sporting events, events occurring in areas with little to no permanent RAN coverage, and emergency situations, such as responding to a natural disaster, where much of the existing infrastructure may be non-operational. The RaaS system provides the benefits of virtualization, including resource pooling and dynamic allocation of resources when and where it is needed. In addition, all of this can be done with little to no advance planning due to the automatic dynamic allocation of the requested resources.

Cellular base stations have stringent synchronization requirements, necessary to support reliable communications. In a typical traditional RAN implementation, all RRUs controlled by the same BBU are kept time-synchronized and frequency-synchronized by relying on the fronthaul signaling, which forces the use of synchronous fronthaul protocols such as CPRI. The methods described herein can be applied to the more general case in which the fronthaul connecting at least one BBU to at least one RRU may be non-deterministic links using an asynchronous network and/or using an asynchronous network protocol, such as IP-based fronthaul links over Ethernet or Wi-Fi networks. Some of the methods may also apply to deployments in which at least one RRU acts as a stand-alone base station where the RRU implements all layers of the RAN protocol stack and communicates directly with the core network without passing through a BBU.

Most modern RAN standards, including LTE, suggest or mandate that all time and frequency references used on one base station (also known as eNB in LTE) are derived from the same clock (referred to as "master clock" hereafter) via simple operations such as digital clock multiplications or divisions. Hence, when the master clock frequency is synchronized within the desired accuracy, all other frequency values, such as sampling rate, carrier frequency, and the like, also are within the desired accuracy. Standard-compliant base stations are required to meet very stringent constraints in terms of master clock accuracy. For example, the error cannot exceed 50 ppb (parts per billion) for LTE macro cells, whereas indoor small cells are given less strict requirements, which range up to 250 ppb for Release 8 enhanced Home Node B's (eHNBs).

While base stations that meet the master clock frequency requirements are standard-compliant, in some deployments it is desirable that the additional synchronization requirement of "timing alignment" to synchronize various protocol-related functions is met among different base stations, especially among units that may generate radio interference on each other. The desired accuracy for timing alignment may depend on the specific deployment. For example, in LTE, a timing alignment between eNBs with an error that doesn't exceed the OFDM cyclic prefix typically may allow a user equipment (UE) receiving radio signals from the interfering eNBs to cope with interference better with respect to the case of eNBs with greater timing alignment error (or no alignment at all). In another LTE example, support of advanced features such as coordinated multipoint (CoMP) and enhanced inter-carrier interference coordination (eICIC) may rely on tighter time-alignment constraints. For example microsecond-level timing alignment, or even better, is desired among eNBs in CoMP configuration.

These synchronization considerations, described above with reference to base stations, hold similarly for RRUs. In particular, RRUs controlled by the same BBU are typically expected to be tightly time aligned (e.g., microsecond-level alignment, or better, in LTE), whereas RRUs that don't generate radio interference on each other and are not controlled by the same BBU may be aligned less strictly, or not be aligned at all.

While the methods described herein may be generally valid irrespectively of the target accuracy for master clock frequency and timing alignment synchronization, the specific target accuracy may impact how the methods are implemented. For example, the same method may be characterized by one or more parameters and the variation of the parameters may control the accuracy of the synchronization algorithm as well as other metrics such as its complexity.

In its simplest form, synchronization refers to master clock frequency and timing alignment synchronization, within the desired accuracy, of a single target radio unit, ora single base station, to a reference clock. Traditionally, this has been achieved by deploying a carrier-grade Global Positioning System (GPS) receiver on the target base station which results in it being locked to the atomic-grade clock of the GPS system. In scenarios with a BBU/RRU split, the BBU is traditionally GPS-synchronized, whereas the RRU is not. In such systems, to guarantee that the synchronization at the RRU side is within the desired accuracy, the link between BBU and RRU has traditionally been a dedicated synchronous link based on CPRI or similar protocols which enables locking of the RRU clock to the BBU clock. While functional for some installations, this option is not always feasible, such as when GPS coverage is poor or absent, and not always cost effective as dedicated synchronous links may be much more expensive than general-purpose links over packet-switched networks such as those based on the Internet Protocol (IP), over links such as Ethernet of Wi-Fi. Various synchronization methods and mechanisms are described herein which function in RaaS systems using a non-deterministic fronthaul link for communication between a BBU and an RRU. The same mechanisms can also be used with a synchronous fronthaul link.

Most methods described herein are based on the observation that a radio unit receiving a radio signal transmitted by a certain reference device may process the signal and estimate the master clock frequency error, the timing alignment error, or other clock metrics, between the clock on the radio unit and the clock on the reference device. Such estimates may be used to correct the clock on the radio unit and lock it to the clock on the reference device, possibly after the processing of the clock metrics with operations such as filtering, noise reduction, and the like. Similar concepts are referred to as "radio interface based synchronization" (RIBS) in LTE Release 12. Clock correction may be in the form of a master clock frequency correction (e.g., voltage change of a voltage-controlled oscillator), a phase correction to the master clock (e.g., a one-time delay or advance of the clock by a certain time interval), or other adjustments to the master clock, including combinations thereof. Master clock frequency correction and its accuracy may be limited by the available hardware (e.g., by the accuracy or the tuning range of a voltage-controlled oscillator), in which case it may be acceptable that the desired correction is applied after some form of approximation (e.g., the desired correction may be 234 ppb, but it may be acceptable to correct 200 ppb on a hardware that only supports multiple of 100 ppb corrections), or it may be desired to correct the residual error (234−200=34 ppb in the example above) in at least one of the quantities derived from the master clock frequency (e.g., digital resampling may be employed to correct the residual sampling frequency error, and digital frequency shift may be employed to correct the residual carrier frequency error). Similarly, timing alignment correction and its accuracy may be limited by the available hardware (e.g., time correction may be constrained to be an integer multiple of the sampling time), which may be acceptable or unacceptable, depending on the embodiment, and hence may require correction of the residual alignment error using other methods or mechanisms (e.g., digital resampling or digital time shift).

In embodiments, an RRU may be equipped with hardware or software able to receive a certain reference signal, or more reference signals, but may be missing at least a portion of the hardware or software needed for extraction of synchronization metrics, so that the RRU may not be able to autonomously implement synchronization tasks. In this embodiment, another device, such as a BBU in communication with the RRU, may be equipped with the hardware or software needed to complete the extraction of synchronization metrics, and may help the RRU in the synchronization process. For example, an RRU may be able to tune to a certain carrier frequency used by an LTE eNB for downlink and record the signal received on it, but may not be able to extract any synchronization metric from the downlink LTE signal. The RRU may send samples of the received signal (or a portion thereof), possibly compressed or otherwise preprocessed, to the associated BBU via a fronthaul link, and the BBU can then extract synchronization metrics. In embodiments with synchronous fronthaul protocols, such as CPRI, the BBU can then use the metrics to correct the fronthaul clock and, consequently, the RRU clock that is locked to the clock of the fronthaul link. In embodiments with non-deterministic fronthaul protocols, such as those using RaaS-FIP, the BBU may send synchronization information to the RRU for correction of its clock. As an example, the BBU may send a command, encapsulated in RaaS-FIP, instructing the RRU to increase its master clock frequency by 30 ppb and to delay its time reference by 2 ns. The choice of what signals to use and at what time to use them may be managed by the BBU or some other device upstream from the BBU.

Such embodiments may allow for support of different synchronization signals, even allowing support for new synchronization signals over time, and can reduce the cost of the RRUs which may dominate the overall system cost. For these reasons, RaaS embodiments based on very simple and inexpensive RRUs driven by powerful and programmable BBUs, may allow for lower cost RAN deployments with greater capabilities.

For reception of a radio signal to use as a reference for synchronization, an RRU may be instructed to tune to a frequency different from the one that it tunes to for main-functionality reception. As a non-limiting example of this, an LTE RRU may tune to a certain LTE uplink frequency for main-functionality reception and may tune to a different frequency, such as the GPS 1575.42 MHz frequency, for synchronization-assisting reception. The RRU may be equipped with different receive chains, which may operate at the same time or at different times, with different chains tuned to different frequencies. In the previous example, the LTE RRU might be equipped with two receive chains, one for main-functionality reception of LTE uplink and one for synchronization-assisting GPS reception, possibly active at the same time. In some embodiments, a receive chain may be dynamically programmable so that at different times the receive chain may tune to different radio frequencies, either selected from a discrete set of frequencies or from a frequency range, and possibly use different sampling rates, either selected from a discrete set of sample rates or from a range of sample rates. For example, the LTE RRU used in the example above might be equipped with a single programmable receive chain which is used at different times for main-functionality reception of LTE uplink, for synchronization-assisting GPS reception, or for synchronization-assisting reception of a downlink cellular signal. The implementation in which at least one of the receive chains is programmable may be used for embodiments in which flexibility and configurability is an important added value, as well as embodiments in which multiple receive chains are not viable or cost effective. In some embodiments, at least one of the receive chains may be able to capture a wideband spectrum that includes at least two radio signals of interest for the RRU. Thus an LTE RRU may be equipped with a single wideband receive chain able to perform, at the same time, both main-functionality reception of LTE uplink and synchronization-assisting reception of a downlink cellular signal using a single receive chain.

In certain implementations, synchronization-assisting reception may prevent the RRU from performing main-functionality reception at a certain time. A cellular RRU may be equipped with a single receive chain unable to receive main-functionality cellular uplink signals and synchronization-assisting GPS signals at the same time, for example. In this case, the logic driving the RRU's configuration and scheduling may account for that information. For example, an LTE BBU may decide not to schedule for uplink traffic any UE near a certain RRU while the RRU is unable to perform LTE uplink reception because the RRU is performing, is about to perform, or has recently performed, synchronization-assisting reception. In another example, scheduling metrics may influence the decision on when to perform synchronization-assisting reception. An LTE RRU may be configured to perform synchronization-assisting reception, for example, only at times in which no main-functionality LTE uplink traffic is scheduled, such as during "empty" uplink subframes, and, for TDD LTE, downlink subframes, DwPTS and guard periods.

An RRU may use a synchronization-assisting radio-frequency signal whose radio spectrum overlaps, entirely or partially, with the radio spectrum of the signal being transmitted by the RRU. In this case, special care may be needed because of the well-known 'deafening' effect that may make it problematic to receive a signal in the scenario. Received signal enhancement techniques, possibly based on self-interference cancellation may be employed, such as those described by Mayank Jain et al. in "Practical, Real-time, Full Duplex Wireless" published in the Proceedings of the 17th Annual International Conference on Mobile Computing and Networking (Mobicom 2011) which is incorporated by reference herein.

Alternatively, or in addition, the logic driving the scheduling decisions and the selection of what synchronization-assisting radio-frequency signals to use, and when to use them, may aim at limiting the occurrences of deafening, or at not allowing any occurrence at all. For example, an LTE RRU may be configured to perform reception on a frequency spectrum that overlaps with the spectrum of the LTE downlink signal transmitted by the RRU only at times in which no downlink transmission is scheduled, such as during "empty" downlink OFDM symbols, and, for TDD LTE, uplink subframes, UpPTS and guard periods. In another example, an LTE BBU may determine not to schedule any LTE downlink signal for a certain RRU while the RRU is performing reception on a frequency spectrum that overlaps with the spectrum of the LTE downlink signal.

Reference now is made in detail to the examples illustrated in the accompanying drawings and discussed below. In the figures of this disclosure, arrows connecting different building blocks may represent physical media (e.g., an optical fiber or twisted pair copper wires) or logical data and/or control pipes (e.g., based on the internet protocol). Such logical connections may be conveyed over a shared or dedicated physical medium. In addition, blocks required for correct network functionality (e.g., routers, switches, gateways, and the like) may be present, although they are not explicitly represented in the figures of the present disclosure.

Figure 2:
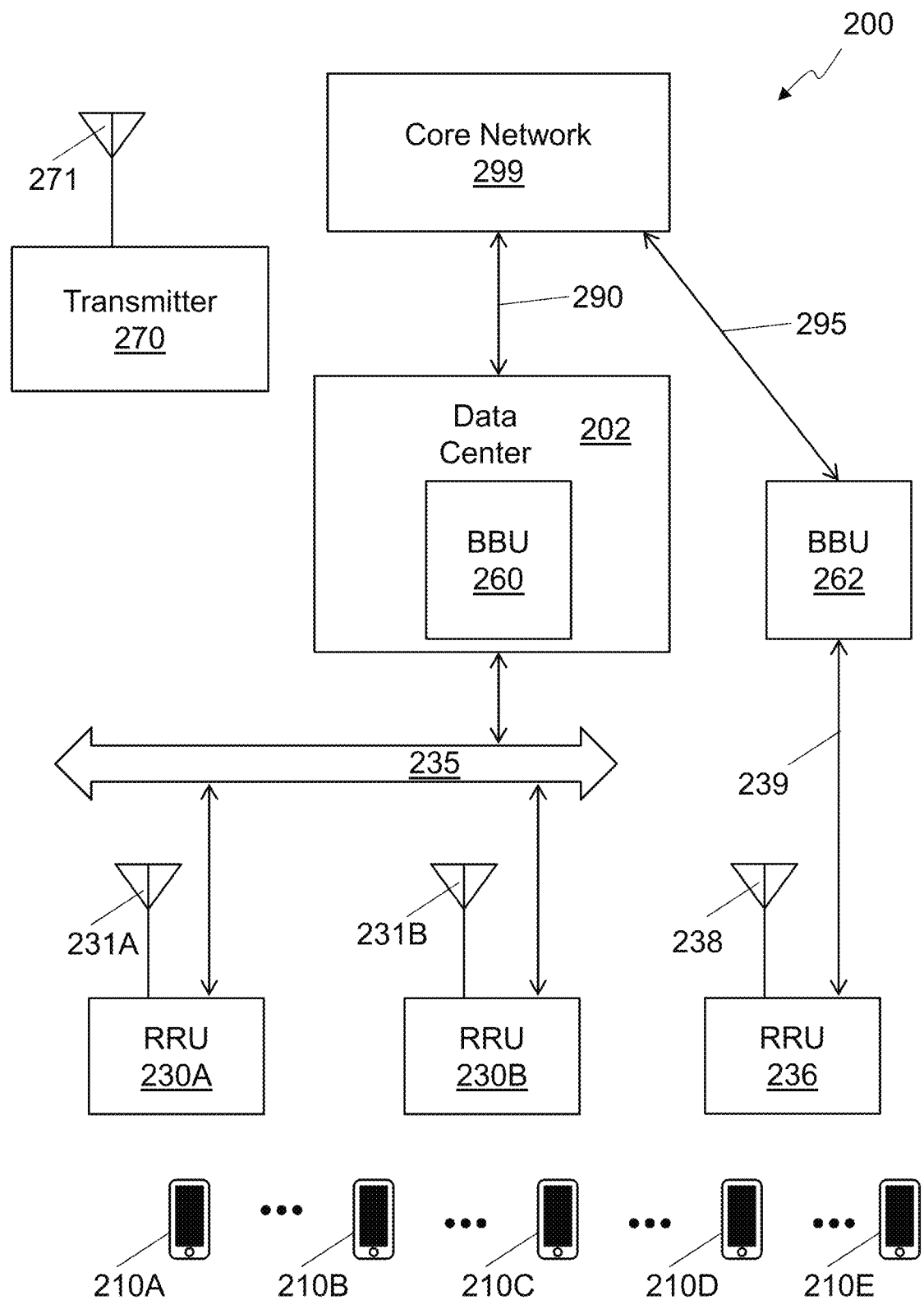
FIG. 2 is a block diagram of an embodiment of a distributed RAN.

FIG. 2 is a block diagram of an embodiment of a distributed radio access network (RAN) 200 using RaaS technology. The RAN 200 represents a radio frequency communication system to facilitate communication between wireless terminals 210A-E and a core network 299. The system 200 includes a first remote radio unit (RRU) 230A and a baseband unit (BBU) 260 coupled by a fronthaul link 235. The RAN 200 can be any type of RAN, but in at least some embodiments, the RAN 200 is an Evolved Universal Terrestrial Radio Access Network (E-UTRAN), and the core network 299 includes an Evolved Packet Core (EPC). While an E-UTRAN system is used as an example in this document, the principles, systems, apparatus, and methods disclosed herein can be applied by one of ordinary skill to different radio access networks, including legacy networks such as Universal Mobile Telecommunications System (UMTS), other contemporary networks such as Worldwide Interoperability for Microwave Access (WiMAX), and future networks.

The RAN 200 includes a first remote radio unit (RRU) 230A coupled to an antenna 231A to communicate with a wireless terminal 210A using radio frequency signals. Depending on the system, any number of RRUs can be included, such as a second RRU 230B coupled to a second antenna 231B, and a third RRU 236 coupled to third antenna 238. The multiple RRUs 230A-B, 236 can be geographically distributed and/or there can be multiple RRUs 230A-B, 236 in a single location. A single RRU 230A can be coupled to any number of antennas, although many installations couple two antennas to each RRU 230A-B, 236. Each RRU 230A-B, 236 includes electronic circuitry to perform at least a first portion of a first-level protocol of the RAN 200 for communicating between a wireless terminal 210A-E and the core network 299.

The RAN 200 also includes a baseband unit (BBU) 260 coupled to the core network 299. Embodiments may include any number of BBUs. The BBU 260 may be implemented using software running on a computer server in data center 202. The server may be one of multiple servers situated in a data center 202 which provides power, cooling, network connectivity, and management, to the servers. In some cases the data center 202 and its servers may be owned by a carrier that operates the RAN 200, but in other cases, the data center 202 and its servers may be owned by a third party provider that leases specific equipment or resources to the operator of the RAN 200.

In embodiments the BBU 260 performs at least a second level protocol of the radio access network (RAN) and may perform a portion of a first-level protocol of the RAN 200. The RRUs 230A-B communicate data of the communication with the at least one wireless terminal 210A-E over the fronthaul link 235 with the BBU 260. The BBU 260, in this embodiment, communicates over the fronthaul link 235 with one or more RRUs 230A-B using a non-deterministic protocol where a latency, an arbitration, a bandwidth, a jitter, a packet order, a packet delivery, or some other characteristic of the communication link, cannot be determined with certainty in advance. One example of a non-deterministic fronthaul link is an Ethernet network. In at least some embodiments, the first-level protocol of the RAN 200 comprises an Evolved Universal Terrestrial Radio Access (E-UTRA) physical-layer (PHY) protocol, and the second-level protocol comprises an E-UTRA medium access control (MAC) protocol. In many embodiments, the non-deterministic protocol uses a packet-based protocol with non-guaranteed in-order packet delivery and/or non-guaranteed packet delivery, such as an internet protocol (IP). Furthermore, some of additional BBUs may be remotely located in the "cloud", that is, data and control transport channels may be established between a remote BBU and an RRU, and those channels may be routed over multiple different physical media, and may be processed by multiple intermediate network nodes, such as routers, switches, and the like.

Embodiments described herein may utilize an adaptive fronthaul protocol for communication between the RRU and the BBU. An adaptive fronthaul protocol provides mechanisms for the BBU and/or RRU to react to changes in the environment, such as the changes in the fronthaul, the radio signal, the loads of the mobile terminals coupled to the RRUs, or other characteristics of the system, to provide a graceful adaptation to the changes instead of losing the connection between the BBU and RRU if the new conditions cannot support the previous parameters of the connection. An adaptive fronthaul protocol is described in more detail in published PCT application WO2016145371A2.

The RAN 200 may alternatively, or additionally, include a stand-alone BBU 262 implemented either as software running on a general-purpose computer or as purpose-built system. The BBU 262 communicates with RRU 236 by a synchronous fronthaul link 239 and with the core network 299 using a backhaul link 295. In some embodiments, the synchronous fronthaul link 239 may utilize protocols of a common public radio interface (CPRI). As in the other BBUs and RRUs of the RAN 200, the BBU 262 performs at least a second-level protocol of the RAN 200 and the RRU 236 performs at least a portion of a first-level protocol of the RAN 200. The RRU 236 also communicates with the at least one wireless terminal 210A-E using radio-frequency signals.

In some embodiments, the RAN 200 may include a transmitter 270 to transmit a synchronization-assisting radio-frequency signal. Depending on the embodiment, the transmitter 270 may be a stand-alone device or the transmitter 270 may be communicably coupled to, and controlled by, the BBU 260. The transmitter 270 may also be referred to as a beacon and the synchronization-assisting radio-frequency signal may in some embodiments be based on a very accurate clock in the transmitter 270, such as a clock derived from a high-accuracy GPS receiver located in the transmitter 270.

The RRUs 230A-B, 236 may be built with any combination of electronic circuitry and software, depending on the embodiment. In some embodiments, at least one RRU 230A, but in other embodiments, every RRU 203A-B, 236, includes a radio-frequency receiver to receive a synchronization-assisting radio-frequency signal. The synchronization-assisting radio-frequency signal can be any radio-frequency signal suitable for extracting time-base information, including, but not limited to, GPS signals, broadcast television signals, cellular downlink signals transmitted by base stations (e.g., LTE eNBs), cellular uplink signals transmitted by UEs, 'beacon' signals transmitted by devices meant to synchronize nearby radios (such as transmitter 270), time radio signals such as WWVB, and the like. In some embodiments, the radio-frequency receiver is a programmable radio which can be used to receive a wide variety of frequencies and modulation schemes. Depending on the embodiment, the radio-frequency receiver may be used for both a RAN 200 uplink receiver and a synchronization-assisting radio-frequency signal receiver. In other embodiments, the receivers for the uplink and the synchronization-assisting radio-frequency signal may be separate receivers.

Once it has received the synchronization-assisting radio-frequency signal, the RRU 230A can process the received signal to derive information about the signal, such as digital samples, compressed digital samples, or otherwise processed digital samples. The information derived from the synchronization-assisting radio-frequency signal is then sent over the fronthaul link 235 to the BBU 260. The RRU 230A then receives synchronization instructions over the fronthaul link from the BBU 260 and adjusts a local clock based on the synchronization instructions.

The BBU 260 is configured to receive the information derived from the synchronization-assisting radio-frequency signal over the fronthaul link 235 and process the information derived from a synchronization-assisting radio-frequency signal to determine synchronization instructions. The BBU 260 then sends the synchronization instructions to the RRU 230A over the fronthaul link 235. In some embodiments, the BBU 260 may also send instructions to the RRU 230A controlling some aspect of receiving the synchronization-assisting radio-frequency signal, such as what frequency to tune to, what time period to capture, or some other aspect of receiving the signal or deriving the information from the signal.

In some embodiments, a second RRU 230B is included which is also communicably coupled to the BBU 260 and configured to receive the synchronization-assisting radio-frequency signal. In such embodiments, the electronic circuitry of the BBU 260 may be further configured to receive and process second information from the second RRU 230B derived from the synchronization-assisting radio-frequency signal, and determine the synchronization instructions based on both the information received from the RRU 230A and the second information received from the second RRU 230B.

While the RAN 200 includes a separate transmitter 270 to transmit the synchronization-assisting radio-frequency signal, other embodiments may transmit the synchronization-assisting radio-frequency signal from an RRU or BBU. So as a non-limiting example, the RRU 230B, which is communicably coupled to the BBU 260, may be configured to transmit the synchronization-assisting radio-frequency signal. In some embodiments the RRU 230B may include a GPS receiver and the synchronization-assisting radio-frequency signal may be derived from a received GPS signal. In some embodiments, the BBU 260 is further configured to send instructions to the second RRU 230B controlling at least one aspect of the synchronization-assisting radio-frequency signal, such as instructions controlling when the synchronization-assisting radio-frequency signal is transmitted, what data is transmitted, and/or a carrier frequency of the synchronization-assisting radio-frequency signal.

Synchronization-assisting devices such as the transmitter 270, which also may be called a beacon, are devices that are deployed with the goal of aiding the synchronization process. A beacon may be a dedicated device with a primary, or only, function of transmitting an accurate synchronization-assisting radio signal. Alternatively, beacon functionalities may be implemented on a device that is intended to perform at least one function not related to the beacon functionalities, such as a device whose main functionality is acting as an LTE eNB but is also equipped with a beacon chain for transmission of a separate synchronization-assisting radio-frequency signal. In some embodiments, transmission of beacon signals may not necessarily require a dedicated transmit chain. For example, in a RaaS LTE deployment, beacon RRUs may transmit synchronization-assisting radio-frequency signals in the portions of the spectrum transmitted by the RRUs in which no LTE downlink signal is transmitted (the downlink guard bands), or at times in which no downlink signal is being transmitted, such as during "empty" downlink OFDM symbols, and, for TDD LTE, uplink subframes, UpPTS and guard periods. This can be done as long as such transmissions are standard-compliant so that no spectrum emission requirements are violated.

A device that implements beacon functionalities may be provided with very accurate clock synchronization by using dedicated hardware or other techniques, including those described herein. For example, a beacon device may be placed in a location with good GPS coverage and be equipped with a carrier-grade GPS receiver, or may be placed in a location with good LTE coverage and be able to achieve accurate clock synchronization by processing LTE downlink signals with at least one of the techniques described herein.

A beacon may transmit at least one signal based on waveforms that allow accurate timing alignment (e.g., waveforms with autocorrelation properties resembling a Dirac delta function), or that allow computationally-simple processing (e.g., waveforms with sparse signal bursts in relatively long silent intervals), or that are otherwise advantageous for a particular embodiment. For example, in a RaaS LTE deployment, it may be desired to deploy a beacon transmitting waveforms that can be processed efficiently by the RRUs in the deployment. This might include waveforms having similar properties with respect to the waveforms processed by the RRUs for main-functionality LTE uplink reception, such as waveforms that may be efficiently processed with FFT operations.

A beacon may be a device that, at least temporarily, performs only a subset of the functionalities of a certain complete device, with such subset including functionalities that may aid synchronization of other devices. In a first LTE example, an eNB beacon may implement only a subset of the functionalities implemented by a complete eNB, such as transmitting standard-compliant LTE signals including, but not limited to, one or more of PSS, SSS, CRS, PBCH, PDCCH, PDSCH, or PMCH. It may also be configured to prevent any UE from camping so that functionalities such as high-throughput PDSCH transmission and PUSCH reception are not performed. In a second LTE example, a UE beacon may implement only a subset of the functionalities implemented by a complete UE, such as having a simplified receiver, able to process a limited set of broadcast signals (PSS, SSS, CRS and PBCH for example), and a simplified transmitter, able to transmit PRACH.

At least one beacon may be placed in a location selected on the basis of at least one of the criteria discussed herein. So for example, in a RaaS deployment, a beacon may be placed to maximize the number of RRUs in the deployment expected to receive the synchronization-assisting radio-frequency signal transmitted by the beacon with an SNR exceeding a certain threshold. A beacon may be moved over time, and the logic driving such moves, such as what direction to move to, when to move, when to stop, where to stop, may be based on at least one of the criteria disclosed herein. So for example, in a RaaS deployment, a beacon may be moved around the deployment so that each RRU in the deployment is guaranteed, at least for part of the time, to receive the synchronization-assisting radio-frequency signal transmitted by the beacon with an SNR exceeding a certain threshold. When at least two beacons are deployed, the logic driving the positioning or the movements of the beacons (or a subset thereof) may jointly consider the positions or the movements of different beacons. The position of at least one beacon (absolute, or relative to at least one other device) may be computed or estimated, and possibly updated over time. This may be done by any appropriate method of mechanism, including those described herein.

In a first example, a beacon may be equipped with a GPS receiver and the position of the beacon may be estimated on the basis of the GPS signals. In a second example, a RaaS LTE BBU may compare the LTE uplink signals, such as PUCCH, PUSCH, DMRS, SRS, and PRACH, received by different RRUs relatively to the same UE beacon's transmission, and estimate the position of the beacon, absolute or relative to the RRUs. In a third example, an LTE UE beacon may perform a RACH procedure towards an eNB and may use the timing advance command received in the random access response (RAR) of the RACH procedure to estimate its position relative to the eNB, or its absolute position if the eNB's position is known or can be estimated. In a fourth example, an LTE UE beacon may use the strategy presented in the third example with different eNBs, at the same time or at different times, to estimate its position, absolute or relative to the eNBs.

Some embodiments may be aided by at least one beacon that transmits synchronization-assisting radio-frequency signals on a frequency spectrum that overlaps with the spectrum on which one or more RRUs in the deployment perform main-functionality reception. For example, in a RaaS LTE deployment, one or more beacons may transmit signals that at least one RRU is able to receive also performing main-functionality LTE uplink reception. This strategy may limit, or remove completely, the occurrence of times at which the RRUs are unable to perform main-functionality reception, and consequently limit, or remove completely, the impact of the occurrences on the scheduling decisions and other RAN configurations. At least one beacon in some embodiments may transmit signals that are compliant with the uplink signals of the RAN standard of the deployment. So for example, in a RaaS LTE deployment, a UE beacon may transmit signals such as PUCCH, PUSCH, DMRS, SRS, and PRACH. In such embodiments, the logic controlling the synchronization of the deployment may be aware of the presence of the beacon, and the awareness may influence scheduling decisions and other RAN configurations. So in an example RaaS LTE deployment aided by a UE beacon, the UE beacon may be scheduled for uplink PUSCH traffic only on PUSCH resources on which no other UE is scheduled, or may be scheduled for contention-free PRACH specifically to aid RRU synchronization in the deployment, or may be configured for contention-based PRACH with parameters, such as the preamble group, that may limit, or remove, the occurrences of interference with other UEs' PRACH. Alternatively, or in addition, at least one beacon may transmit signals that are not compliant with the uplink signals of the RAN standard of the deployment. For example, in a RaaS LTE deployment, a beacon may transmit synchronization signals in portions of the spectrum received by the RRUs in the deployment on which no LTE uplink signal is transmitted (the uplink guard bands).

As discussed in this section, the activity of one or more beacons, such as what to transmit, when to transmit, where to be placed, in an embodiment may influence or may be influenced by the scheduling decisions or other RAN metrics in the embodiment, including the synchronization status of the RRUs. A beacon may autonomously make decisions on its activity, receiving no instructions from any other device. So for example a beacon may be configured at deployment time to perform periodically a predetermined transmission, or may be configured to autonomously make decisions on what to transmit and when to transmit. In some embodiments, a beacon may exchange information with at least one device, such as a BBU, that may drive, or may be aware of, the scheduling decisions or other RAN metrics, and the information may influence the beacon's activity. So for example a beacon in a RaaS deployment may receive information on the poor synchronization status of a certain RRU, and may react accordingly, by transmitting synchronization-assisting radio-frequency signals more frequently or with higher power, for example. The information exchange may be based on a communication protocol, which may include support for messages that include, but are not limited to, status reports or commands that may influence the activity of the beacon scheduling decisions, or other configuration parameters in the RAN deployment. The information may be exchanged over a dedicated wired or wireless connection, or over a general-purpose connection such as an IP-based network. In a RAN deployment, the information may be exchanged with connectivity provided by the RAN itself. For example, a UE beacon and a BBU in a RaaS LTE deployment may exchange synchronization-assisting information via PDSCH and PUSCH. In such embodiments, the information may be encapsulated in IP packets, or may be encapsulated in a communication protocol that the UE and the BBU are able to identify and process without involving the EPC (hence reducing the burden on the core network).

Figure 3:
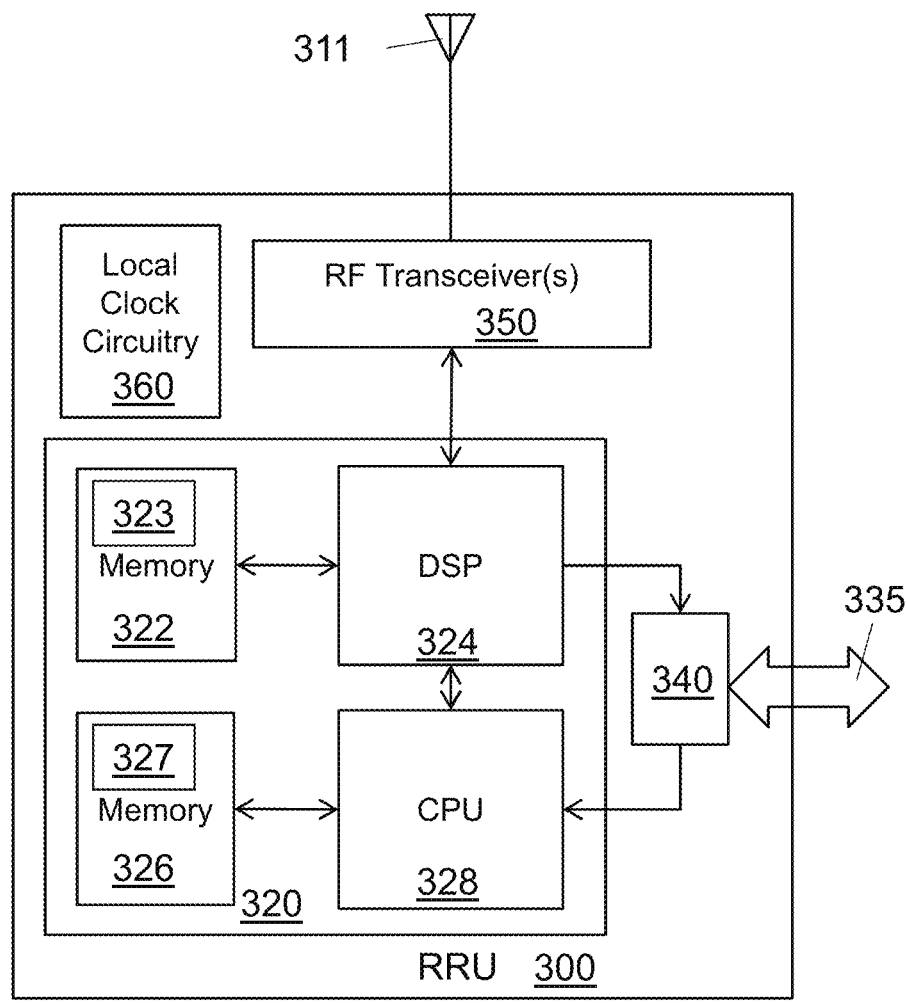
FIG. 3 is a block diagram of an embodiment an RRU.

FIG. 3 is a block diagram of an embodiment of an RRU 300. The RRU 300 is an electronic device that includes a processing subsystem 320 which includes at least one processor 324, 328 and at least one non-transitory computer memory 322, 326 coupled to the at least one processor 324, 328. The at least one non-transitory computer memory 322, 326 holds instructions 323, 327 executable by the at least one processor 324, 328, to perform functions of the RRU 300. The RRU 300 also includes local clock circuitry 360 and radio-frequency transceivers 350 to communicate with a wireless terminal using antenna 311. The radio frequency transceivers 350 may include one or more transmitters and one or more receivers which are independently controllable. A fronthaul link interface 340 couples the at least one processor 324, 328 to the fronthaul link 335. Thus the RRU 300 includes an interface 340 to the fronthaul link 335, a processor 324, 328, coupled to the fronthaul link 335, and at least one non-transitory machine readable medium 322, 326, coupled to the processor 324, 328, and storing one or more instructions 323, 327 that in response to being executed by the processor 324, 328 cause the RRU 300 to carry out at least one of the functions of an RRU described herein.

In some embodiments, the processing subsystem 320 may include a general purpose CPU 328 and a digital signal processor (DSP) 324 with various tasks split between the processors 324, 328 such as having the DSP 324 perform the FFT and IFFT operations and having the CPU 328 provide control functionality. In other embodiments, the processing subsystem 320 may only include the DSP 324 and may not include the CPU 328. In such embodiments, the DSP 324 may be able to provide control functionality, or the control functionality may be provided by other circuitry. In other embodiments, the processing subsystem 320 may only include the CPU 328 and not include the DSP 324. In such embodiments, the CPU 328 may be able to perform signal processing functions such as one or more of a FFT, IFFT, selection, quantization, adaptive compression, expansion, formatting, and the like or the raw samples may be sent to a BBU for the signal processing functionality. Alternatively, dedicated circuitry may be provided for some of the signal processing functions so the CPU 328 can provide the overall control functionality. Other embodiments may have any number of processors of any type, with various functions distributed to the various processors in any way, depending on the embodiment.

In embodiments, instructions 322, 327 to cause the processor 324, 328 to perform a method for synchronizing a remote radio unit (RRU) in a distributed radio access network (RAN) are stored in the memory 322, 326. The method performed by the processor 324, 328 includes receiving a synchronization-assisting radio-frequency signal and sending information derived from the synchronization-assisting radio-frequency signal over a fronthaul link 335 to a baseband unit (BBU).

The method also includes controlling a local clock 360 in the RRU 300 using the fronthaul link 335. In some embodiments, the fronthaul link 335 is a synchronous fronthaul link and the local clock 360 in the RRU 300 is locked to the fronthaul link 335. In at least one embodiment, the synchronous fronthaul link uses a common public radio interface (CPRI) protocol and CPRI synchronization is used to control the local clock 360 in the RRU 300. In some embodiments, the RRU 300 uses the fronthaul link 335 to receive synchronization instructions from the BBU, the synchronization instructions determined based on the information derived from the synchronization-assisting radio-frequency signal and sent to the BBU. The synchronization instructions can then be used to control the local clock 360 in the RRU 300. The synchronization instructions may include an instruction to change a frequency, a phase, or other aspects of the local clock 360. In some embodiments, the fronthaul link 335 is a non-deterministic fronthaul link and the local clock 360 in the RRU 300 is adjusted based on the synchronization instructions received. In some embodiments, the non-deterministic fronthaul link utilizes an internet protocol (IP).

In embodiments, the RRU 300 communicates with at least one wireless terminal using radio-frequency signals, performs at least a first portion of a first-level protocol of the RAN, and communicates data of the communication with the at least one wireless terminal over the fronthaul link 335 with the BBU. In some embodiments, the RAN protocol utilizes an Evolved Universal Terrestrial Radio Access Network (E-UTRAN), and the first-level protocol is an Evolved Universal Terrestrial Radio Access (E-UTRA) physical-layer (PHY) protocol.

In an embodiment, the radio-frequency transceivers 350 include two separate radio-frequency receivers, and the RRU tunes a first radio-frequency receiver to an uplink frequency, receives uplink data through the first radio-frequency receiver, and sends the uplink data to the BBU over the fronthaul link 335. The RRU also tunes a second radio-frequency receiver to a carrier frequency of the synchronization-assisting radio-frequency signal, receives the synchronization-assisting radio-frequency signal through the second radio-frequency receiver, and sends information derived from the synchronization-assisting radio-frequency signal to the BBU over the fronthaul link 335.

In another embodiment, the radio frequency transceivers 350 include a single radio-frequency receiver, and the RRU 300 tunes the radio-frequency receiver in the RRU to an uplink frequency for a first period of time, receives uplink data through the first radio-frequency receiver during the first period of time, and sends the uplink data to the BBU over the fronthaul link 335. The RRU 300 then tunes the radio-frequency receiver to a carrier frequency of the synchronization-assisting radio-frequency signal during a second period of time that is non-overlapping with the first period of time, receives the synchronization-assisting radio-frequency signal through the radio-frequency receiver during the second period of time, and sends information derived from the synchronization-assisting radio-frequency signal to the BBU over the fronthaul link 335.

In yet another embodiment, the radio frequency transceivers 350 include a single wideband radio-frequency receiver. The RRU 300 may use the wideband radio-frequency receiver to simultaneously receive both uplink data in a first frequency sub-band and the synchronization-assisting radio-frequency signal in a second frequency sub-band. The uplink data and the information derived from the synchronization-assisting radio-frequency signal are then sent to the BBU over the fronthaul link.

In embodiments, the RRU 300 receives control instructions from the BBU over the fronthaul link 335 and controls at least one aspect of the receiving of the synchronization-assisting radio-frequency signal or the derivation of the information from the synchronization-assisting radio-frequency signal based on the control instructions. Control instructions can include, but are not limited to, an instruction to set a receive frequency for a radio-frequency receiver in the RRU 300 or an instruction to set a time period of the synchronization-assisting radio-frequency signal to use to create the information derived from the synchronization-assisting radio-frequency signal.

Figure 4:
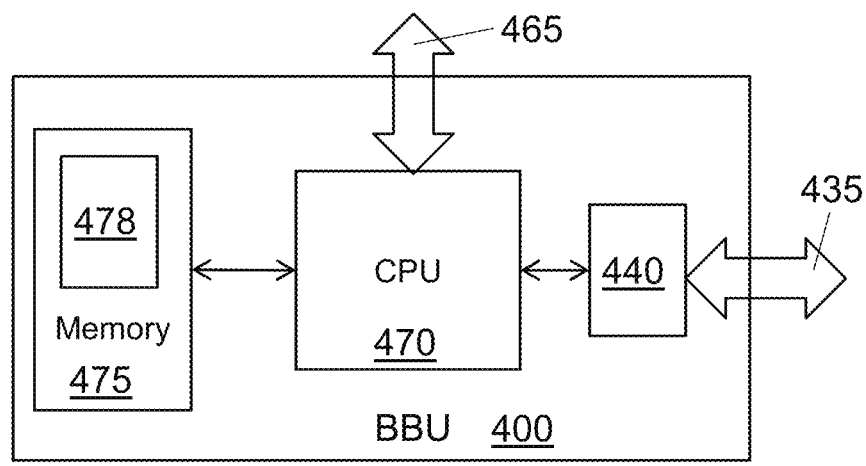
FIG. 4 is a block diagram of an embodiment of a BBU.

FIG. 4 is a block diagram of an embodiment of a baseband unit (BBU) 400 for use with a remote radio unit (RRU) in a distributed radio access network (RAN) that is coupled to a core network. The BBU 400 is an electronic device that includes a processor 470, one or more memory devices 475 coupled to the processor 470 and storing instructions 478 to configure the processor 470, and interface circuitry 440 coupled to the processor 470 and a fronthaul link 435. The BBU 400 also includes an interface 465 for communicating with a core network of the RAN. In some embodiments, the BBU 400 may use a common interface to a network to use for both the fronthaul link 435 and backhaul link. The instructions 478 may cause the processor 470 to perform any function of a method for a BBU described herein. The processor 470 is configured to perform at least a second-level protocol of the RAN and communicate over the fronthaul link 435, communicating data with the RRU for communication with a wireless terminal. The fronthaul link 435 may be a synchronous fronthaul link, and may, for example, use a CPRI protocol. In other embodiments, the fronthaul link may be a non-deterministic fronthaul link, and may, for example, use an internet protocol (IP). In some embodiments, the BBU 400 supports a RAN protocol utilizing an Evolved Universal Terrestrial Radio Access Network (E-UTRAN), the core network includes an Evolved Packet Core (EPC), the first-level protocol uses an Evolved Universal Terrestrial Radio Access (E-UTRA) physical-layer (PHY) protocol, and the second-level protocol uses an E-UTRA medium access control (MAC) protocol.

The processor 470 may perform a variety of functions to manage and control the RRU. In embodiments the processor 470 is configured to synchronize a remote radio unit (RRU) in a distributed radio access network (RAN) by receiving information derived from a synchronization-assisting radio-frequency signal over a fronthaul link 435 from the RRU, processing the information derived from a synchronization-assisting radio-frequency signal to determine synchronization instructions, and using the synchronization instructions and the fronthaul link 435 to control a local clock in the RRU. In a RAN where the BBU 400 is associated with more than one RRU, the BBU 400 may receive and process information from multiple RRUs derived from the synchronization-assisting radio-frequency signal and use the information received from the multiple RRUs to determine the synchronization instructions.

The synchronization instructions can include, but are not limited to, an instruction to change a frequency or a phase of the local clock. In some embodiments, the synchronization instructions are determined based, at least in part, on a determined physical location of the RRU. In some embodiments, the fronthaul link 435 is a synchronous fronthaul link and the BBU 400 generates a clock for the fronthaul link 435 based on the synchronization instructions. In some embodiments, the synchronization instructions are sent to the RRU over the fronthaul link.

In some embodiments, the device transmitting the synchronization-assisting radio-frequency signal is in communication with the BBU 400, and the BBU 400 sends control instructions to the device controlling at least one aspect of the synchronization-assisting radio-frequency signal transmitted by the device. The at least one aspect can include, but is not limited to, a time period of transmission, a transmission power, or a carrier frequency of the synchronization-assisting radio-frequency signal transmitted by the device.

It is important to note that the clock accuracy of some of the signals used for a synchronization-assisting radio-frequency signal may not meet consistently, or may not meet at all, some of the accuracy requirements of the RAN. Note that even a signal that consistently meets the desired synchronization requirements at the transmit site may be received with poor signal-to-noise ratio (SNR), or with other impairments, such as Doppler shift or propagation delays, that may affect the reliability of the synchronization process. Hence, to decide which signal to use as a reference clock for synchronization, information on at least one of the following metrics may be used: the expected clock accuracy at the transmit site, known or estimated, the expected quality of the received signal, such as estimates of the SNR, Doppler shift, or propagation delay, or the complexity of the synchronization process (e.g., extracting a time reference from GPS signals may be more complex than from LTE downlink signals). Different signals may be used at different times, or possibly simultaneously, and the decision on which signals to use at a certain time may be adapted based on the criteria described above, or other criteria. For example, an RRU may use GPS signals most of the time, but switch to nearby LTE eNB broadcast signals if the relevant SNR metric indicates that GPS coverage has worsened, for example du to bad weather. In another example an RRU may use multiple signals (either at the same time, or at different times) and compute the clock correction metrics by combining the relevant metrics obtained from the multiple signals by averaging, filtering, or or using other statistical and/or signal processing techniques, possibly with weighting or similar techniques that give more influence to metrics obtained from a signal estimated to be more reliable.

So in some embodiments, the BBU can send control instructions to the RRU to change a frequency to use for reception of the synchronization-assisting radio-frequency signal. The BBU may determine the frequency based on a quality metric of received information derived from the synchronization-assisting radio-frequency signal. The quality metric of the received information may be, but is not limited to, a signal-to-noise ratio. The BBU may alternatively or additionally send control instructions to the RRU to change a time period of the synchronization-assisting radio-frequency signal to use to create the information derived from the synchronization-assisting radio-frequency signal. The time period may be based on a schedule of communication between the RRU and a wireless terminal or a schedule of communication between another RRU and a wireless terminal. In embodiments the BBU may send control instructions to the RRU to schedule communication between the RRU and a wireless terminal selected to avoid a time period of the synchronization-assisting radio-frequency signal to use to create the information derived from the synchronization-assisting radio-frequency signal.

Figure 5:
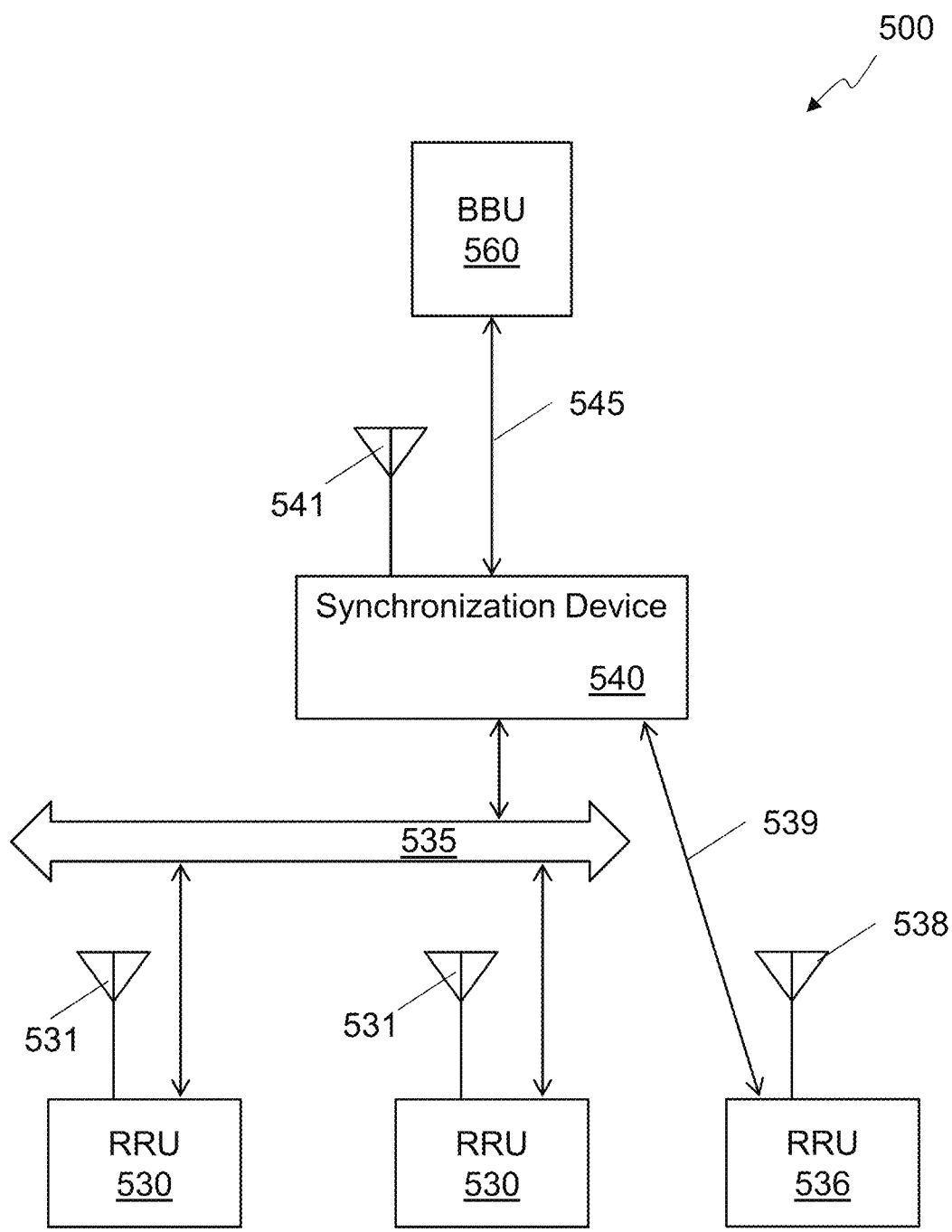
FIG. 5 is a block diagram of an embodiment of a distributed RAN using a synchronization device.

FIG. 5 is a block diagram of an embodiment of a distributed RAN 500 using a synchronization device 540. In some embodiments of a RAN, an intermediate network unit, or synchronization device 540, may be placed between the BBU 560 and one or more RRUs 530, 536. The synchronization device 540 may communicate with the BBU via the RaaS-FIP protocol, possibly over a packet-switched fronthaul link 545, or any other type of connection. The synchronization device 540 may be able to achieve accurate synchronization via at least one of the techniques described herein by receiving a synchronization-assisting radio-frequency signal through antenna 541. Depending on the embodiment, the synchronization device 540 can utilize one or more fronthaul links 535, 539 to communicate with various RRUs 530, 536, with some embodiments using a fiber-grade low-latency low-jitter fronthaul link 539 such as CRPI to communicate with the RRU 536 and some embodiments using a non-deterministic fronthaul link 535, such as RaaS-FIP, to communicate with other RRUs 530. Any combination of various fronthaul links may be used to communicate with RRUs 530-536 depending on the embodiment.

The synchronization device 540 may be specifically tailored to acquire synchronization and 'distribute' it to at least one RRU 530, 536, and/or the synchronization may be used for other purposes as well. In one embodiment, the synchronization device 540 may be a network router, part of wired or wireless network deployment to support mobile base stations. In an embodiment, the synchronization device 540 may also be an RRU which includes all of the radio functionality of an RRU, besides providing synchronization to the at least one other RRU.

In another embodiment, the synchronization device 540 may be a macrocell, placed outdoors, possibly with antennas deployed on a tower, and the at least one RRU 530, 536 may be deployed in its vicinity. In such an embodiment, the synchronization device 540 keeps both the macrocell (which may possibly include multiple sectors) and the at least one RRU 530, 536 synchronized.

In yet another embodiment, the synchronization device 540 may be a fronthaul protocol converter and be used to convert RaaS-FIP into CPRI. In the implementation, the RRU 536 may be a CPRI-compatible remote radio head (RRH).

The synchronization device 540 may be deployed on a roof, or anyway in an outdoor location with good reception of a synchronization-assisting radio-frequency signal, such as a GPS signal, or the like, whereas the at least one connected RRU 530, 536 may be deployed indoors, where the reception of the synchronization-assisting radio-frequency signal may be impossible or with a limited quality and reliability.

The synchronization device 540 may, in some embodiments, be connected to an RRU 536 via a circuit-switched fronthaul connection 539 able to accurately convey synchronization information to the RRU 536, such as by using CPRI over a fiber-grade low-latency low-jitter link 539 using the mechanisms provided by CPRI for conveying synchronization information. As an alternative to using CPRI for data communication, the synchronization device 540 may still use RaaS-FIP to communicate with the at least one RRU 536, but on a low-latency low-jitter circuit-switched link 539. In such an embodiment, separate clock-related information may be conveyed over the link, in addition to the RaaS-FIP signal, to keep the at least one RRU 536 synchronized. Additionally or alternatively, the synchronization device 540 may distribute synchronization information to the at least one RRU 530 over a non-deterministic fronthaul link 535.

In embodiments, the RRUs 530, 536 connected to the synchronization device 540 are synchronized using a common clock source, generated from the synchronization device 540 according to at least one synchronization method described herein. The RRUs 530-536 may be co-located, deployed in the same box, tower, building, corporate campus, geographical location, or the like. The synchronized nature of the co-located RRUs may be leveraged to improve the performance of the deployment via techniques such as CoMP, whose benefit is greater when applied to co-located, densely-deployed RRUs.

An embodiment of the synchronization device 540 includes a first interface to a first fronthaul link 545 coupled to the BBU 560, and a second interface to the second fronthaul link 535, 539 coupled to an RRU 530, 536. The synchronization device 540 also includes a processor, coupled to the first interface and the second interface which is coupled to at least one non-transitory machine readable medium which includes one or more instructions that in response to being executed by the processor cause the synchronization device to carry out at least one of the methods disclosed herein.

In some embodiments, the synchronization device 540 receives uplink data from an RRU 530 over the second fronthaul link 535 and sends the uplink data to the BBU 560 over the first fronthaul link 545, which may be a non-deterministic link. A radio-frequency receiver in the synchronization device 540 is tuned to a carrier frequency of the synchronization-assisting radio-frequency signal (SARFS) and the SARFS is received through the radio-frequency receiver. Examples of the SARFS include, but are not limited to, a GPS satellite signal, a downlink signal from a cellular base station, a television broadcast signal, an uplink signal from a cellular terminal, or a time broadcast signal. Information derived from the SARFS is then sent over the second fronthaul link 545 to the BBU 560. The information derived from the SARFS may simply be digitized samples of the SARFS, digitized samples of an intermediate frequency (IF) signal generated from the SARFS, digitized samples of a baseband signal carried by the SARFS, data generated by using signal processing techniques, such as an inverse fast-Fourier transform (IFFT), performed on the SARFS, the IF signal, or the baseband signal, a compressed version of one of the data types previously mentioned, or any other type of data derived from the SARFS.

The BBU 560, or some other upstream device that receives the information derived from the SARFS, processes that information to generate synchronization instructions to synchronize the local clock of the synchronization device 540 to the RAN 500 and sends those instructions to the synchronization device 540. The synchronization device 540 receives the synchronization instructions, determined based on the information derived from the SARFS, from the BBU 560 over the fronthaul link 545 and uses those instructions to control its local clock. The synchronization device 540 then controls a local clock in the RRU 530, 536 using the fronthaul link 535, 539, thus using the synchronization instructions to control the local clock in the RRU 530, 536. In some embodiments, at least one of the fronthaul links is a synchronous fronthaul link 539, and the local clock in the RRU 536 is locked to the fronthaul link 539 to control the local clock of the RRU 536. The fronthaul link 539 in at least one embodiment uses a common public radio interface (CPRI) protocol and CPRI synchronization is used to control the local clock in the RRU 536. In some embodiments, synchronization instructions may be sent to one or more RRUs 530, 536 over a fronthaul link 535, 539. Synchronization instructions may include an instruction to change a frequency or a phase of the local clock.

Figure 6:
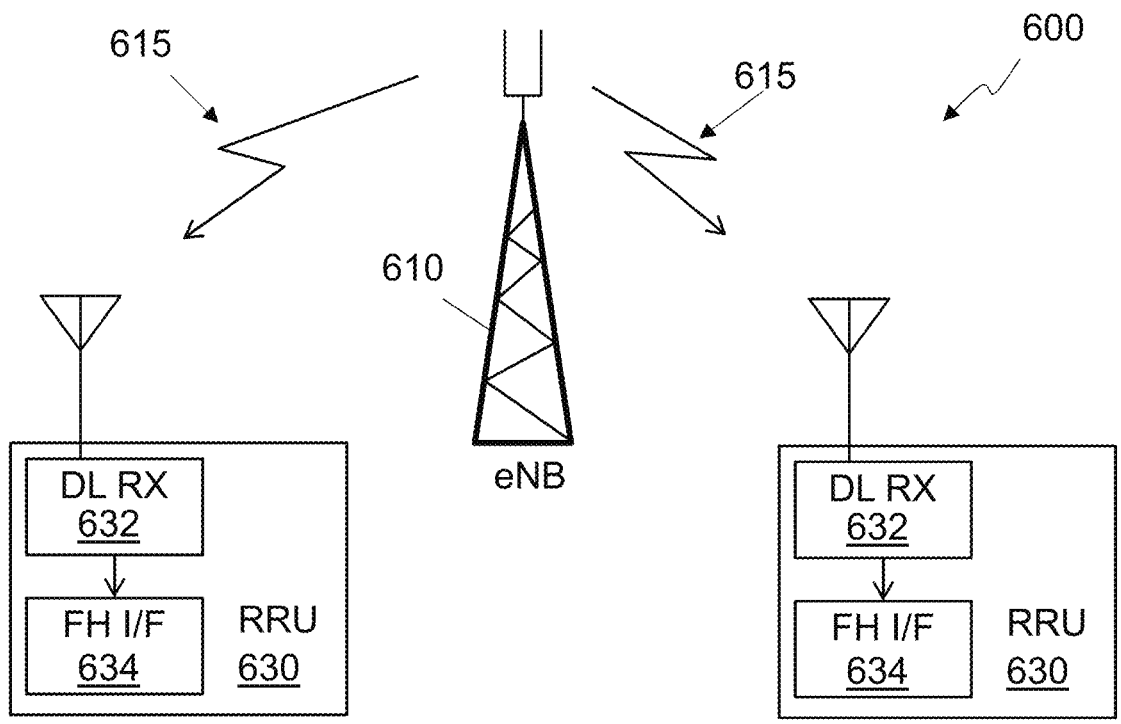
FIG. 6 is a diagram showing an embodiment of synchronization based on a downlink signal.

FIG. 6 is a diagram showing an embodiment of synchronization based on a downlink signal 615 used as a SARFS, which is an embodiment of a RAN system 600. In this embodiment, a downlink (DL) signal 615 transmitted by at least one nearby eNB 610 is used for synchronization. The signal 615 may be at least one of a primary synchronization sequence (PSS), secondary synchronization sequence (SSS), physical broadcast channel (PBCH), cell-specific reference signal (CRS), or a combination thereof. The at least one signal may be received by the RRU 630 via a dedicated RF receiver chain 632, or by periodically retuning the existing receiver chain to the frequency used for transmission by the at least one nearby eNB 610. In the latter case, the RRU 630 may not be able to receive regular uplink signals from a UE while the receiver chain 632 is used to receive the SARFS. Information derived from the SARFS is sent by the RRU

630 using the fronthaul interface 634 to another device, such as a BBU, which processes the information to generate synchronization instructions.

Uplink configuration and scheduling determined by the BBU and sent to the RRU 630 may be tuned so as to minimize the performance degradation stemming from skipping reception of uplink signals during the retuning phases. If the carrier frequency used by the at least one eNB 610 for transmission is the same carrier frequency employed by the RRU 630 for DL transmission, the BBU may instruct the RRU 630 to shut down DL transmission when it intends to receive the SARFS transmitted by the eNB 610, to avoid self-interference. If at least a partial subframe boundary synchronization is present, that is, the RRU 630 and the at least one eNB 610 are subframe aligned with reduced timing error, the retuning may be carried out, under control of the BBU, when the transmission of the synchronization signal, such as a PSS, is expected, thus minimizing the fraction of time the DL chain of the RRU 630 has to be shut off. Alternatively, if the RRU 630 and the at least one eNB 610 are asynchronous, the RRU 630 tuner has to be retuned, under control of the BBU, for long enough to receive at least one transmission of the synchronization signal.

Figure 7:
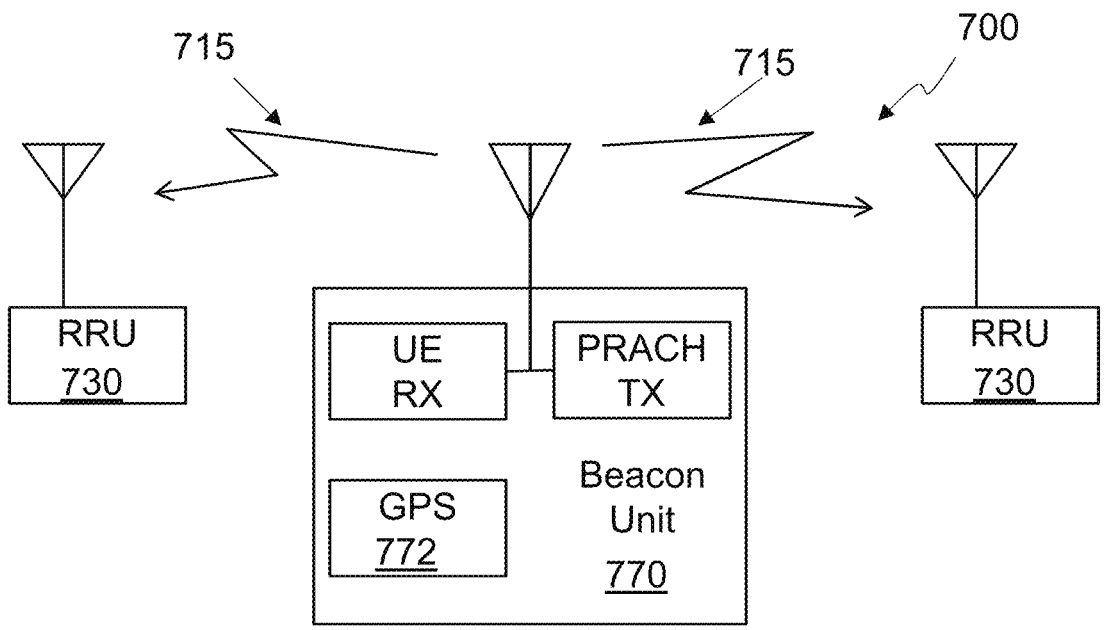
FIG. 7 is a diagram showing an embodiment of synchronization based on an uplink signal.

FIG. 7 is a diagram showing an embodiment of synchronization based on an uplink (UL) 715, which is another embodiment of a RAN system 700. An uplink signal 715 transmitted by at least one nearby UE 770 is used for synchronization. The nearby UE 770 may be a dedicated beacon unit. The beacon unit 770 may be located in an area with good GPS reception and with good propagation conditions from/to multiple RRUs 730. The beacon unit 770 may have a GPS-synchronized UE circuitry 772 and baseband UE processing, possibly simplified by eliminating certain unnecessary functionality to reduce costs. The beacon unit 770 may periodically attempt random access on the uplink frequency used by nearby RRUs 730 for UL reception. Periodic random access attempts may sequentially target a different RRU 730, that is, the UE embedded in the beacon unit 770 may sequentially camp on each detectable RRU 730 and perform at least one random access for each RRU 730 after camping. The detected RRUs 730 may be explored in a round-robin fashion. Special resources, such as preamble identity, subframe configuration, center frequency, and the like, may be assigned to the beacon unit 770 so as to make it easy to distinguish preamble transmissions from the beacon unit 770 and preamble transmissions from regular UEs. As an alternative, all RRUs 730 in a given area may share a common set of resources devoted to preamble transmissions from the beacon unit 770, and all RRUs 730 may receive the preamble transmissions on the shared resources, the shared resources being different from the PRACH resources devoted to preamble transmissions from regular UEs. At least one RRU 730 may detect a preamble transmission from the beacon unit 730, interpret it as a transmission from the beacon unit 730 rather than a random access attempt from a regular UE, and estimate the frequency offset or other synchronization offset metrics between the received preamble signal and the oscillator embedded in the RRU 730. The offset may be used to correct the embedded oscillator's errors and drifts.

In embodiments, an RRU may be equipped with RF devices and functions needed to receive and sample the synchronization-assisting radio-frequency signal, while all of the corresponding baseband functions may be carried out by the BBU. The BBU may then transmit information to the RRU on how to correct the estimated frequency error. In this process, the BBU may utilize one of the numerous algorithms known to provide frequency error estimation by processing reference signals, or a sampled version of them, such as the algorithms in "Carrier-frequency estimation for transmissions over selective channels," by M. Morelli and U. Mengali, published in *IEEE Transactions on Communications*, vol. 48, no. 9, pp. 1580-1589, September 2000, and "ML estimation of time and frequency offset in OFDM systems," by J. J. van de Beek, M. Sandell and P. O. Borjesson, published in *IEEE Transactions on Signal Processing*, vol. 45, no. 7, pp. 1800-1805, July 1997, among others. Both of the previous publications are incorporated by reference herein. Also, the BBU may convey information to the RRU on how to correct the clock error by transmitting simple commands in the form "increase/decrease the RRU clock reference by N ppb", where N is the desired granularity of the error correction process.

The BBU may ask the RRU to tune to a specific frequency and sample a specific signal based on the quality of the radio signal. For example, the BBU may ask the RRU to sample an eNB signal in indoor settings with poor GPS reception, or to sample a GPS signal in remote rural areas with poor LTE coverage. The BBU may decide dynamically which source to ask for, based on a suitable metric of the radio signal quality. For example, the BBU may ask the RRU to sample a different signal when the synchronization-assisting radio-frequency signal experiences a degradation in signal-to-noise ratio (SNR). Similarly, the BBU may ask the RRU to switch from LTE reference signals to GPS reference signals, and vice versa. The same concepts hold for any radio signal emitted from a source that meets the desired synchronization accuracy requirements.

Another synchronization issue is alignment across geographically separated RRUs, of the OFDM (SC-FDMA for UL) symbol boundary, the subframe boundary, and the radio frame boundary. Achieving this synchronization among nearby RRUs enables advanced algorithms and techniques such as Coordinated Multi-Point (CoMP), enhanced inter-carrier interference coordination (eICIC), and the like. Once the master clocks of a plurality of RRUs are synchronized and fulfill the accuracy requirements of the standard, sampling frequency is assumed to be synchronized, too. However, having locked oscillators is not enough to achieve symbol/subframe/radio frame synchronization among multiple RRUs. Achieving such synchronization of protocol elements, denoted as timing alignment herein, is important to enable CoMP, eICIC, and other advanced features. Similarly to carrier clock synchronization, timing alignment can be achieved through assistance of at least one of a GPS signal, DL synchronization signal, or UL synchronization signal. Synchronization instructions received by the RRU from a BBU can be used for the timing alignment, such as an instruction to change a phase of the local clock, which may be interpreted as a one-time delay or advance of the local clock signal by a certain amount of time. Some embodiments may utilize multiple local clocks which are controlled by the BBU using the synchronization instructions, with one of the clocks used for carrier clock synchronization and another clock used for the timing alignment.

In one embodiment, a GPS signal is used by the RRU for timing alignment, with some processing of the GPS signal performed by the BBU. This may be accomplished by providing the RRU with a GPS receiver, from which GPS-grade atomic-clock level accuracy can be extracted. Symbol, subframe, and radio frame boundaries can be obtained from the GPS clock in a uniform fashion across the plurality of RRUs, so that, since they share the same clock (obtained from GPS signals), timing alignment is automatically ensured with a precision related to the common clock.

In another embodiment, a downlink signal transmitted by at least one nearby eNB is used for synchronization. The signal may be at least one of a primary synchronization sequence (PSS), secondary synchronization sequence (SSS), physical broadcast channel (PBCH), cell-specific reference signal (CRS), or a combination thereof. The BBU may try to detect the at least one DL synchronization signal based on the information it receives from the RRU. If the at least one signal is detected correctly, and if an absolute timing reference can be extracted from the signal, such as a subframe index and a system frame number, the BBU may align the timing of the RRU with the reference extracted from the detected signal. The boundaries of the detected signal may also be used to align timing. For example, if the signal occupies one OFDM symbol, the first sample of the detected signal may be used as a reference by the BBU to determine OFDM symbol boundaries. Note that the synchronization accuracy in this scenario may be limited by the propagation delay between the nearby eNB and the RRU. Since such propagation delay is in general unknown, the uncertainty applies to the timing alignment as well. Thus, timing alignment between the RRU and the eNB may be at best within the maximum propagation delay between the RRU and the eNB.

In a yet another embodiment, an uplink signal transmitted by at least one nearby UE is used for timing alignment. The nearby UE may be a dedicated GPS-synchronized beacon unit, as described above. The beacon unit may periodically attempt random access on the uplink frequency used by nearby RRUs for UL reception, and the preamble transmissions may be received by nearby RRUs and sent to their respective BBUs which can then use the received signal boundaries to synchronize the timing of the RRUs. The timing reference that can be obtained from a received preamble transmission includes a subframe boundary, since the preambles are transmitted with subframe alignment. Depending on the PRACH resource configuration, additional timing reference information may be obtained. For example, if one subframe of every radio frame is configured for PRACH, and if a preamble transmitted by the beacon unit is detected, the detected signal may also be used by the BBU to determine an absolute reference of a subframe index within a radio frame, corresponding to the PRACH configuration. Additional timing reference may be obtained by suitable association of a preamble index with timing reference information. For example, the preamble index may indicate a system frame number (SFN). For example, the beacon unit may encode the system frame number in the preamble identifier as follows: preambleID=SFN modulo N, where N is the number of available preamble identifiers. The beacon unit may then choose a preamble identifier according to the formula above when attempting the random access. The nearby RRUs that receive the preamble transmission may have their BBUs extract the SFN (modulo N) and use this information for radio frame synchronization. The additional timing uncertainty stemming from the modulo operation (due to the finite number of signature sequences for the preamble transmission) may be solved via network timing alignment or other methods. A special set of PRACH resources may be assigned to preamble transmissions from the beacon unit, so as to avoid confusion between the preamble transmissions and random access attempts from regular UEs.

In order to improve the timing alignment accuracy of the embodiments described above, the propagation delays between RRU and the eNB or the beacon unit may be estimated or measured. For example, propagation delay may be estimated from the geographical distance between the sites, and the estimated value (assumed constant for the entire lifetime of the deployment) may be used to compensate the timing alignment error. In another example, propagation delay may be measured when the devices are deployed, and the measured value (assumed constant for the entire lifetime of the deployment) may be used to compensate for the timing alignment error.

In a different embodiment, the propagation delay may be periodically measured autonomously by the network, and the measured value may be used to compensate for the timing alignment error until an updated measurement is available. In some embodiments, the measurement may rely on regular LTE standard protocols, such as the timing advance scheme used by LTE network to correct propagation delays and ensure uplink timing alignment. In other embodiments GPS signals may be used to determine locations of the RRUs with respect to the source of the synchronization-assisting radio-frequency signal and the distances between the source and the RRUs calculated using those locations. The calculated distances may then be used to correct the timing alignment.

Figure 8:
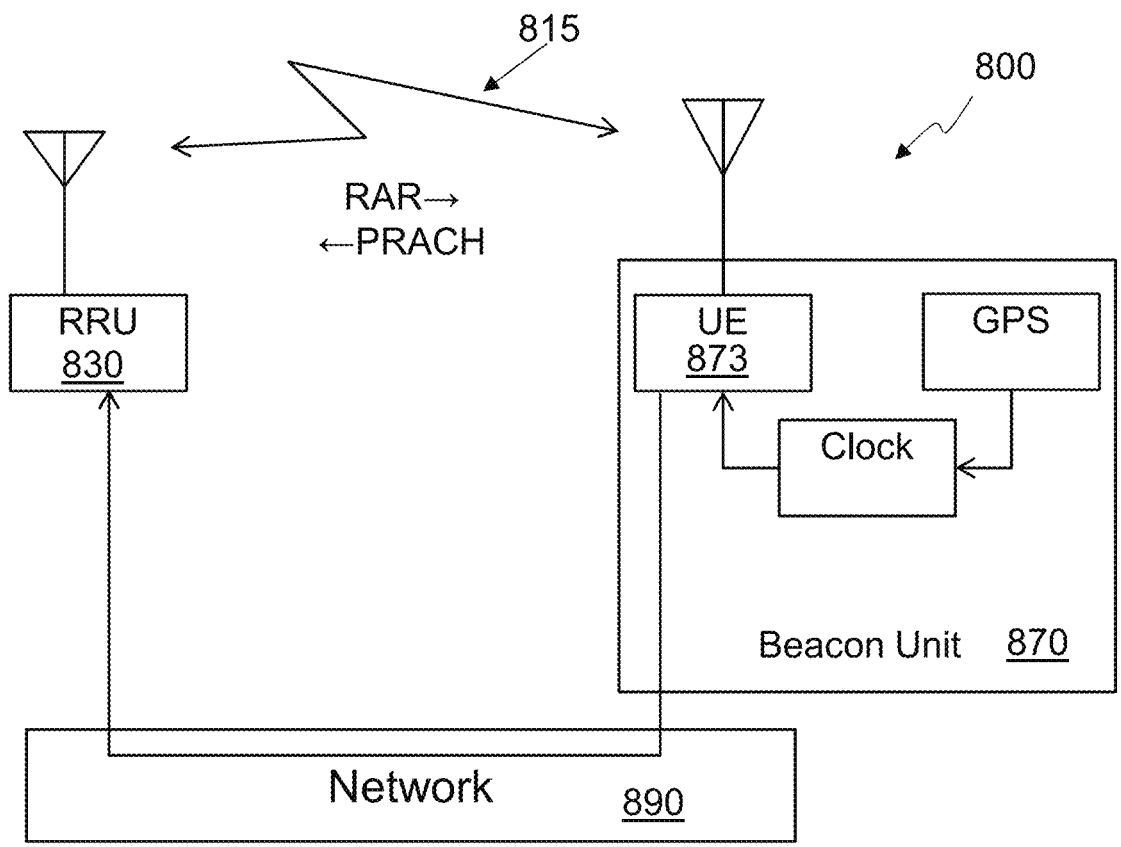
FIG. 8 is a diagram showing an embodiment of synchronization based on an uplink signal with compensation of propagation delay.

FIG. 8 is a diagram showing an embodiment of synchronization based on an uplink signal 815 with compensation of propagation delay in a RAN system 800 which may be similar to the system 700 shown in FIG. 7. The beacon unit 870 may be equipped with an embedded UE 873 having both an UL transmitter and a DL receiver, and may have connection to the network 890 via a cable, wireless connectivity, or the like. The beacon unit 870 may attempt random access as described above and may receive a random access response (RAR) from at least one RRU 830 in the vicinity. The random access responses may contain timing advance information, from which an estimate of the propagation delay between the beacon unit 870 and the RRU 830 can be obtained. The timing advance information or propagation delay estimates may be provided by the beacon unit 870 to a control unit in the network, such as a BBU, which may use the information to aid timing alignment for the nearby RRUs.

Some embodiments perform joint synchronization of two or more RRUs. Typical examples of RRUs for which joint synchronization may be desired include a set of RRUs controlled by the same BBU. As discussed herein, the target synchronization accuracy may depend on the specific deployment and the support (or lack thereof) of advanced features such as CoMP. Hence, the target synchronization accuracy may change over time for a certain deployment as the feature set of the deployment changes. For example a RaaS deployment may add support for downlink joint beamforming among different RRUs after the initial installation which may require tighter synchronization among the RRUs after the feature addition. Similarly, the synchronization accuracy actually achieved, or expected to be achieved, may influence the decision on what features are supported in a certain deployment. For example a RaaS deployment provisioned for CoMP may be configured not to perform CoMP among at least some of the RRUs when the target synchronization accuracy for CoMP support is not achieved among the RRUs. Such decisions, and the like, may be adjusted over time, and advanced features requiring tight synchronization among different RRUs may be dynamically enabled or disabled depending on the synchronization accuracy achievable at the time.

In one embodiment, a group of RRUs may be configured so that the same synchronization-assisting radio-frequency signal is used by the RRUs. For example, all RRUs in a RaaS deployment may be configured to use the downlink signal transmitted by the same macro eNB as their synchronization-assisting radio-frequency signal.

In another embodiment, a group of RRUs may be configured so that different synchronization-assisting radio-frequency signals may be used by different RRUs. For example, some RRUs in a RaaS deployment may be configured to use the downlink signal transmitted by a certain eNB, while other RRUs in the deployment may be configured to use the downlink signal transmitted by the another eNB. The remaining RRUs in the deployment may be configured with a signal set including both the eNBs with the partitioning into three groups possibly driven by the SNR at which the two eNBs are received by different RRUs. As conditions change, the SNR at each RRU for the signal from each eNB may change, and the partitioning can be dynamically changed over time.

In both implementations, the logic driving the configuration may use at least some of the criteria described earlier, such as SNR-based selection, dynamically updated over time, of the synchronization-assisting radio-frequency signals. Different RRUs may perform synchronization-assisting reception at the same time, or at different times, and the reception may utilize the same synchronization-assisting radio-frequency signal, or different synchronization-assisting radio-frequency signals, all under control the BBU. The considerations presented earlier about how these synchronization-logic decisions may influence the RAN-scheduling decisions, or may be influenced by the RAN-scheduling decisions, still apply. In an LTE RaaS example, if a certain RRU is unable to perform LTE uplink reception while performing synchronization-assisting reception, the BBU may decide not to schedule any UE nearby the RRU for uplink traffic, or it may decide to schedule at least one UE for uplink traffic only if at least another RRU is expected to receive the uplink traffic with acceptable quality, such as with a certain target SNR, or better. As these examples point out, the synchronization logic and the scheduling decisions may use information on the quality of the uplink radio signal for a certain UE as received by a certain RRU, including such metrics as the SNR, the received signal power, the Doppler shift, and the propagation delay, may be estimated by processing uplink signals such as PUCCH, PUSCH, DMRS, SRS, PRACH, as well as the quality of the downlink signal relevant to the UE and the RRU, as reported by the UE via RSRP reporting or otherwise determined or estimated. In a another example, an LTE RRU may be configured to perform synchronization-assisting reception only at times in which it is not scheduled to receive any LTE uplink traffic, such as during empty uplink sub-frames, and, for TDD LTE, downlink sub-frames, DwPTS and guard periods, or at times in which at least another RRU is expected to receive the scheduled uplink traffic with acceptable quality. In yet another example, an LTE BBU may decide not to schedule any LTE downlink signal for a certain RRU while the RRU is performing reception on a spectrum that overlaps with the spectrum of the LTE downlink signal. The BBU may also decide to schedule the LTE downlink signal (or a portion thereof) for transmission by one or more other RRUs if the RRUs are not performing reception on a spectrum that overlaps with the spectrum of the LTE downlink signal and if the signal transmitted by the RRUs is expected to be received by the target UEs with acceptable quality. While these examples have referred to binary scheduling decisions where a certain signal is scheduled, or not scheduled, for transmission or reception by a certain RRU, similar considerations apply to finer scheduling decisions (e.g., the LTE MCS for PUSCH or PDSCH). In an LTE example, a UE may be scheduled with a certain PUSCH MCS if two nearby RRUs are able to receive the PUSCH, and to a lower MCS if one of the RRUs is unable to receive the PUSCH due to receiving the synchronization-assisting radio-frequency signal. In another LTE example, the number of UEs co-scheduled on the same time and frequency may be adjusted as a function of the number of RRUs that are able to perform main-functionality reception at that time.

In some embodiments at least one RRU may use a synchronization-assisting radio-frequency signal transmitted by another RRU in the same deployment. For example, a RaaS RRU may use the downlink signal transmitted by one or more RRUs in the same RaaS deployment. A group of one or more RRUs in a certain deployment may be configured for self-synchronization, defined herein as a scenario in which each RRU in the group is configured with a synchronization-assisting radio-frequency signal set that only includes signals transmitted by RRUs in the deployment. Master/slave configurations may be used, in which one or more RRUs act as masters with their transmit signals are used for synchronization by at least one RRU, and other RRUs act as slaves with their transmit signals not used for synchronization by any RRU. RRUs that are estimated to provide better-quality synchronization signals may be configured as masters, for example units equipped with dedicated hardware such as a carrier-grade GPS receiver, or units able to receive synchronization-assisting radio-frequency signals with higher SNR. According to how such criteria or metrics vary over time, at least one RRU may be configured as a master at times, and as a slave at different times. Special cases of this method include a round-robin configuration, in which different units act as masters at different times. In this case, the round-robin order may be predetermined, or dynamically adjusted based on various criteria and metrics. In one RaaS example, at least one RRU may be equipped with a dedicated GPS-grade receive chain and may act as a master, while the remaining RRUs may not be equipped with any dedicated receive chain and may act as slaves of the master RRU's transmit signal. In this example, the slave units may be of lower power class than the master units, such as using macro-cell radio units with a dedicated GPS receive chain as masters, and small-cell RRUs with a single programmable receive chain tuned to main-functionality reception or to synchronization-assisting reception at different times for slaves. Because the self-synchronizing architectures are special cases of the more general architectures described herein, the same methods can be applied to both. In particular, the logic in the BBU determining which synchronization-assisting radio-frequency signals to use, when to use them, and on what RRUs to use them may influence, or be influenced by, the RAN-scheduling decisions RAN scheduling decisions include, but are not limited to, what UEs to schedule for uplink or downlink traffic and what RRUs to schedule for reception or transmission. As discussed, such joint decisions on synchronization and scheduling may account for radio performance metrics, such as EU throughout, RRU throughput, deafening effects due to self-interference, and the like.

Timing alignment synchronization of an RRU to a reference signal may be affected by the time it takes for the reference radio signal to reach the RRU from its transmitting source (propagation delay). In some embodiments, it may be acceptable not to correct the propagation delay, such as a single-cell deployment with no significant interference. In other deployments, it may be acceptable not to correct the propagation delay as long as the difference among the propagation delays relative to different RRUs in the deployment is within the acceptable time-alignment ambiguity. For example a group of RaaS LTE RRUs may all use the same macro base station for synchronization-assisting reception, and the propagation delays from the base station may be unknown; but it may be known or estimated that the difference between the various propagation delays is within the desired inter-RRU alignment accuracy, for example when the RRUs are deployed in a relatively small area. In other deployments, however, techniques for propagation delay estimation and compensation may be desired, such as those presented in the following.

In one embodiment, at least one of the propagation delays may be measured, or estimated from the geographical distance between the sites, at the time of deployment, and the values may be used to correct the timing alignment. For example, it may be desired to estimate the propagation delay or the geographical distance between at least one pair of RRUs in the same deployment, or between at least one RRU in the deployment and one synchronization-assisting radio-frequency signal source. Such measurements or estimates may be updated over time.

In another embodiment, at least one of the propagation delays (or differential propagation delays) may be estimated autonomously within the deployment, and the values may be used to correct the timing alignment. For example, when two or more RRUs are able to receive the same signal, it may be possible to estimate the absolute or differential propagation delays relative to the RRUs. For example a RaaS LTE BBU may compare the LTE uplink signals, such as PUCCH, PUSCH, DMRS, SRS, and PRACH, received by different RRUs relatively to the same transmission, and estimate the differential propagation delays among the RRUs. It may be desirable to jointly use information on the absolute or differential propagation delays from different sources. For example a RaaS LTE BBU may, for a group of RRUs, estimate the propagation delays with respect to different UEs, and use this information for triangulation or similar techniques that may enhance timing alignment.

In yet another embodiment, techniques from the first implementation and techniques from the second implementation may be used jointly, either at the same time or at different times. For example, a RaaS LTE BBU may use information on the geographical separation between different RRUs, jointly with information on the absolute or differential propagation delays of the RRUs with respect to one or more UEs, possibly estimated as discussed for the second implementation.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and/or block diagrams in the figures help to illustrate the architecture, functionality, and operation of possible embodiments of systems, devices, methods, and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems or circuitry that perform the specified functions or acts, or combinations of special purpose hardware, circuitry, and computer instructions.

These computer program instructions, such as those used to implement any method described herein, may also be stored in a non-transitory computer-readable medium, such as a tangible computer memory, or tangible memory, that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
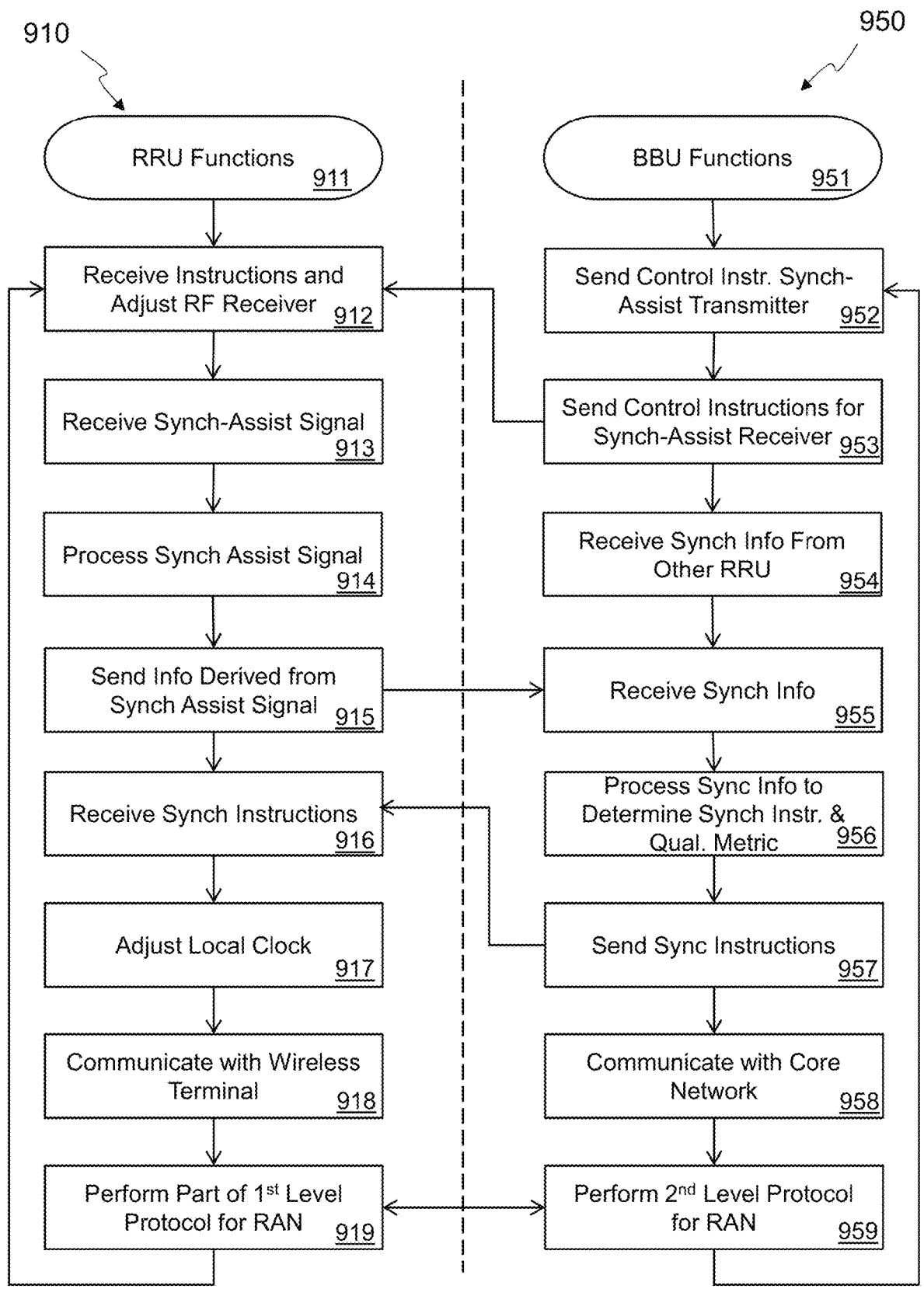
FIG. 9 is a flowchart of an embodiment of a method for synchronization of RRUs in a distributed RAN.

FIG. 9 is a flowchart of an embodiment of a method for synchronization of RRUs in a distributed RAN. FIG. 9 includes a flowchart 910 showing function of an RRU 911 interlinked with a flowchart 950 showing functions of a BBU 951.

The flowchart 910 is for a method for synchronizing a remote radio unit (RRU) in a distributed radio access network (RAN). In some embodiments, the flowchart 910 includes receiving control instructions from the BBU over a fronthaul link and controlling at least one aspect of the receiving of the synchronization-assisting radio-frequency signal or the derivation of the information from the synchronization-assisting radio-frequency signal based on the control instructions 912. Controlling the at least one aspect of the receiving of the synchronization-assisting radio-frequency signal or the derivation of the information from the synchronization-assisting radio-frequency signal may include setting a receive frequency for a radio-frequency receiver in the RRU based on the control instructions to receive the synchronization-assisting radio-frequency signal through the radio frequency receiver or setting a time period of the synchronization-assisting radio-frequency signal, based on the control instructions, to use to create the information derived from the synchronization-assisting radio-frequency signal.

The flowchart 910 continues with receiving a synchronization-assisting radio-frequency (SARFS) signal 913.

Depending on the embodiment, the SARFS may be a GPS satellite signal, a downlink signal from a cellular base station, a television broadcast signal, an uplink signal from a cellular terminal, a time broadcast signal, or any other appropriate radio-frequency signal. Information is then derived from the SARFS by processing the synchronization-assisting radio-frequency signal 914. The information derived from the SARFS may simply be digitized samples of the SARFS, digitized samples of an intermediate frequency (IF) signal generated from the SARFS, digitized samples of a baseband signal carried by the SARFS, data generated by using signal processing techniques, such as an inverse fast-Fourier transform (IFFT), performed on the SARFS, the IF signal, or the baseband signal, a compressed version of one of the data types previously mentioned, or any other type of data derived from the SARFS. Thus the method may include compressing a block of digital samples captured from the received synchronization-assisting radio-frequency signal to create the information derived from the synchronization-assisting radio-frequency signal.

The flowchart 910 continues with sending information derived from the synchronization-assisting radio-frequency signal over a fronthaul link to a baseband unit (BBU) 915 and controlling a local clock in the RRU using the fronthaul link 917. Some embodiments include receiving synchronization instructions 916 from the BBU using the fronthaul link, the synchronization instructions determined based on the information derived from the synchronization-assisting radio-frequency signal. The synchronization instructions can include, but are not limited to, an instruction to change a frequency or a phase of the local clock, and can be used to control the local clock 917 in the RRU. In some embodiments, the fronthaul link is a synchronous fronthaul link and the local clock in the RRU is locked to the fronthaul link to control the local clock 917. As one example, the synchronous fronthaul link may use a common public radio interface (CPRI) protocol and CPRI synchronization is used to control the local clock in the RRU. In other embodiments, the fronthaul link is a non-deterministic fronthaul link, which may utilize an internet protocol (IP), and adjusting the local clock in the RRU 917 is based on using the synchronization instructions to control the local clock in the RRU.

The flowchart 910 continues with communicating with the at least one wireless terminal using radio-frequency signals 918 and performing at least a first portion of a first-level protocol of the RAN 919. Data of the communication with the at least one wireless terminal is communicated over the fronthaul link with the BBU. In some embodiments the RAN protocol comprises an Evolved Universal Terrestrial Radio Access Network (E-UTRAN), and the first-level protocol comprises an Evolved Universal Terrestrial Radio Access (E-UTRA) physical-layer (PHY) protocol.

In some embodiments, the adjusting the radio frequency receiver 912 may include tuning a first radio-frequency to an uplink frequency, receiving uplink data through the first radio-frequency receiver and sending the uplink data to the BBU over the fronthaul link. The adjusting the radio frequency receiver 912 may also include tuning a second radio-frequency receiver to a carrier frequency of the synchronization-assisting radio-frequency signal and receiving the synchronization-assisting radio-frequency signal through the second radio-frequency receiver. The adjusting the radio frequency receiver 912 may, in other embodiments, alternatively include tuning a radio-frequency receiver in the RRU to an uplink frequency for a first period of time and tuning the radio-frequency receiver to a carrier frequency of the synchronization-assisting radio-frequency signal during a second period of time that is non-overlapping with the first period of time. Then the uplink data is received through the first radio-frequency receiver during the first period of time and sent to the BBU over the fronthaul link, and the synchronization-assisting radio-frequency signal received through the radio-frequency receiver during the second period of time. In at least one embodiment, a single wide-band radio-frequency receiver is used to simultaneously receive both uplink data in a first frequency sub-band and the synchronization-assisting radio-frequency signal in a second frequency sub-band.

In embodiments, at least one non-transitory machine readable medium includes one or more instructions that in response to being executed on a computing device cause the computing device to carry out the method represented by the flowchart 910 or another method described herein.

The flowchart 951 shows an embodiment of a method for synchronizing a remote radio unit (RRU) in a distributed radio access network (RAN) using a BBU 951. The flowchart 951 may optionally include sending control instructions to a device controlling at least one aspect of the synchronization-assisting radio-frequency signal transmitted by the device 952, where the at least one aspect may include, but is not limited to, a time period of transmission, a transmission power, or a carrier frequency of the synchronization-assisting radio-frequency signal transmitted by the device. The flowchart 951 may also optionally include sending control instructions to the RRU 953 to change a frequency to use for reception of the synchronization-assisting radio-frequency signal or to change a time period of the synchronization-assisting radio-frequency signal to use to create the information derived from the synchronization-assisting radio-frequency signal. The BBU may determine the frequency to use to receive the synchronization-assisting radio-frequency signal based on a quality metric of received information, such as a signal-to-noise ratio, derived from the synchronization-assisting radio-frequency signal. The BBU may determine the time period based on a schedule of communication between the RRU and a wireless terminal or a schedule of communication between another RRU and a wireless terminal. In some embodiments, the BBU may send control instructions to the RRU to configure a schedule for communication between the RRU and a wireless terminal, the schedule selected to avoid a time period of the synchronization-assisting radio-frequency signal to use to create the information derived from the synchronization-assisting radio-frequency signal.

The flowchart 950 may optionally include receiving, from a second RRU, second information 954 derived from the synchronization-assisting radio-frequency signal. The second information may also be processed. The flowchart 950 also includes receiving information derived from a synchronization-assisting radio-frequency signal over a fronthaul link from the RRU 955. The information derived from a synchronization-assisting radio-frequency signal is processed to determine synchronization instructions 956 and the BBU may optionally determine one or more quality metrics based on the information derived from a synchronization-assisting radio-frequency signal. In some embodiments, the synchronization instructions are determined based, at least in part, on a determined physical location of the RRU. In some embodiments, the synchronization instructions are determined based on both the first information from one RRU and the second information from another RRU.

The synchronization instructions and the fronthaul link are used to control a local clock in the RRU. In some embodiments the fronthaul link is a synchronous fronthaul link and a clock for the fronthaul link is generated based on the synchronization instructions. In other embodiments the synchronization instructions are sent to the RRU 957 over the fronthaul link. The synchronization instructions can include, but are not limited to, an instruction to change a frequency or a phase of the local clock.

The flowchart 951 also includes communicating with a core network of the RAN 958 and performing at least a second level protocol of the RAN 959. Data is communicated with the RRU for communication with a wireless terminal. In some embodiments the RAN protocol is consistent with an Evolved Universal Terrestrial Radio Access Network (E-UTRAN), the core network comprising an Evolved Packet Core (EPC), and the second-level protocol comprises an E-UTRA medium access control (MAC) protocol.

In embodiments, at least one non-transitory machine readable medium includes one or more instructions that in response to being executed on a computing device cause the computing device to carry out the method represented by the flowchart 951 or another method described herein.

As will be appreciated by those of ordinary skill in the art, aspects of the various embodiments may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "server," "circuit," "module," "client," "computer," "logic," or "system." Furthermore, aspects of the various embodiments may take the form of a computer program product embodied in one or more computer-readable medium(s) having computer program code stored thereon.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be the to be non-transitory. A computer data transmission medium, such as a transmission line, a coaxial cable, a radio-frequency carrier, and the like, may also be the to store data, although any data storage in a data transmission medium can be the to be transitory. Nonetheless, a computer-readable storage medium, as the term is used herein, does not include a computer data transmission medium.

Computer program code for carrying out operations for aspects of various embodiments may be written in any combination of one or more programming languages, including an object oriented programming language such as Java, Smalltalk, C++, or the like, and conventional procedural programming languages, such as the "C" programming language or similar programming languages. The computer program code if loaded onto a computer, or other programmable apparatus, produces a computer implemented method. The instructions which execute on the computer or other programmable apparatus may provide the mechanism for implementing some or all of the functions/acts specified in the flowchart and/or block diagram block or blocks. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Examples of various embodiments are described below:

Embodiment 1

A radio frequency communication system to facilitate communication between at least one wireless terminal and a core network, the system comprising a first remote radio unit (RRU) and a baseband unit (BBU) coupled by a fronthaul link utilizing a non-deterministic protocol;

the RRU comprising electronic circuitry configured to:

communicate with the at least one wireless terminal using radio-frequency signals;

perform at least a first portion of a first-level protocol of a radio access network (RAN);

communicate data of the communication with the at least one wireless terminal over the fronthaul link with the BBU;

receive a synchronization-assisting radio-frequency signal;

send information derived from the synchronization-assisting radio-frequency signal over the fronthaul link to the BBU;

receive synchronization instructions over the fronthaul link from the BBU; and adjust a local clock based on the synchronization instructions;

the BBU comprising electronic circuitry configured to:

perform at least a second level protocol of the radio access network (RAN);

receive the information derived from the synchronization-assisting radio-frequency signal over the fronthaul link;

process the information derived from a synchronization-assisting radio-frequency signal to determine synchronization instructions; and send the synchronization instructions to the RRU over the fronthaul link.

Embodiment 2

The system of embodiment 1, wherein the non-deterministic protocol comprises an internet protocol (IP).

Embodiment 3

The system of embodiment 1 or 2, wherein the RAN protocol comprises an Evolved Universal Terrestrial Radio Access Network (E-UTRAN);

the core network comprises an Evolved Packet Core (EPC);

the first-level protocol comprises an Evolved Universal Terrestrial Radio Access (E-UTRA) physical-layer (PHY) protocol; and the second-level protocol comprises an E-UTRA medium access control (MAC) protocol.

Embodiment 4

The system of any of embodiments 1 through 3, further comprising a third device to transmit the synchronization-assisting radio-frequency signal.

Embodiment 5

The system of embodiment 4, wherein the third device is communicably coupled to, and controlled by, the BBU.

Embodiment 6

The system of any of embodiments 1 through 5, further comprising a second RRU communicably coupled to the BBU and configured to transmit the synchronization-assisting radio-frequency signal.

Embodiment 7

The system of embodiment 6, the second RRU comprising a GPS receiver, wherein the synchronization-assisting radio-frequency signal is derived from a received GPS signal.

Embodiment 8

The system of embodiment 6 or 7, the electronic circuitry of the BBU further configured to send instructions to the second RRU controlling at least one aspect of the synchronization-assisting radio-frequency signal.

Embodiment 9

The system of any of embodiments 6 through 8, the electronic circuitry of the BBU further configured to send instructions to the second RRU controlling when the synchronization-assisting radio-frequency signal is transmitted.

Embodiment 10

The system of any of embodiments 6 through 9, the electronic circuitry of the BBU further configured to send instructions to the second RRU controlling a carrier frequency of the synchronization-assisting radio-frequency signal.

Embodiment 11

The system of any of embodiments 1 through 10, further comprising a second RRU communicably coupled to the BBU and configured to receive the synchronization-assisting radio-frequency signal;

the electronic circuitry of the BBU further configured to receive and process second information from the second RRU derived from the synchronization-assisting radio-frequency signal, and determine the synchronization instructions based on both the information received from the RRU and the second information received from the second RRU.

Embodiment 12

A method for synchronizing a remote radio unit (RRU) in a distributed radio access network (RAN), the method comprising:

receiving a synchronization-assisting radio-frequency signal;

sending information derived from the synchronization-assisting radio-frequency signal over a fronthaul link to a baseband unit (BBU); and controlling a local clock in the RRU using the fronthaul link.

Embodiment 13

The method of embodiment 12, further comprising:

communicating with the at least one wireless terminal using radio-frequency signals;

performing at least a first portion of a first-level protocol of the RAN;

communicating data of the communication with the at least one wireless terminal over the fronthaul link with the BBU.

Embodiment 14

The method of embodiment 13, wherein the RAN protocol comprises an Evolved Universal Terrestrial Radio Access Network (E-UTRAN); and the first-level protocol comprises an Evolved Universal Terrestrial Radio Access (E-UTRA) physical-layer (PHY) protocol.

Embodiment 15

The method of any of embodiments 12 through 14, wherein the fronthaul link is a synchronous fronthaul link and the local clock in the RRU is locked to the fronthaul link.

Embodiment 16

The method of any of embodiments 12 through 15, wherein the fronthaul link uses a common public radio interface (CPRI) protocol and CPRI synchronization is used to control the local clock in the RRU.

Embodiment 17

The method of any of embodiments 12 through 16, further comprising:

receiving synchronization instructions from the BBU using the fronthaul link, the synchronization instructions determined based on the information derived from the synchronization-assisting radio-frequency signal; and using the synchronization instructions to control the local clock in the RRU.

Embodiment 18

The method of embodiment 17, wherein the synchronization instructions comprise an instruction to change a frequency or a phase of the local clock.

Embodiment 19

The method of embodiment 17 or 18, wherein the fronthaul link is a non-deterministic fronthaul link, the method further comprising adjusting the local clock in the RRU based on the synchronization instructions to control the local clock in the RRU.

Embodiment 20

The system of embodiment 19, wherein the non-deterministic fronthaul link utilizes an internet protocol (IP).

Embodiment 21

The method of any of embodiments 12 through 20, further comprising:

tuning a first radio-frequency receiver in the RRU to an uplink frequency;

receiving uplink data through the first radio-frequency receiver;

sending the uplink data to the BBU over the fronthaul link;

tuning a second radio-frequency receiver in the RRU to a carrier frequency of the synchronization-assisting radio-frequency signal; and receiving the synchronization-assisting radio-frequency signal through the second radio-frequency receiver.

Embodiment 22

The method of any of embodiments 12 through 20, further comprising:

tuning a radio-frequency receiver to an uplink frequency for a first period of time;

receiving uplink data through the first radio-frequency receiver during the first period of time;

sending the uplink data to the BBU over the fronthaul link;

tuning the radio-frequency receiver to a carrier frequency of the synchronization-assisting radio-frequency signal during a second period of time that is non-overlapping with the first period of time;

receiving the synchronization-assisting radio-frequency signal through the radio-frequency receiver during the second period of time.

Embodiment 23

The method of any of embodiments 12 through 20, further comprising:

using a single wideband radio-frequency receiver to simultaneously receive both uplink data in a first frequency sub-band and the synchronization-assisting radio-frequency signal in a second frequency sub-band;

sending the uplink data to the BBU over the fronthaul link.

Embodiment 24

The method of any of embodiments 12 through 23, wherein the synchronization-assisting radio-frequency signal comprises a GPS satellite signal, a downlink signal from a cellular base station, a television broadcast signal, an uplink signal from a cellular terminal, or a time broadcast signal.

Embodiment 25

The method of any of embodiments 12 through 24, wherein the RRU is a first RRU and the synchronization-assisting radio-frequency signal comprises a signal from a second RRU.

Embodiment 26

The method of embodiment 25, wherein the signal from the second RRU comprises a downlink signal or a dedicated beacon signal.

Embodiment 27

The method of any of embodiments 12 through 26, further comprising:

receiving control instructions from the BBU over the fronthaul link; and controlling at least one aspect of the receiving of the synchronization-assisting radio-frequency signal or the derivation of the information from the synchronization-assisting radio-frequency signal based on the control instructions.

Embodiment 28

The method of embodiment 27, the control instructions comprising:

an instruction to set a receive frequency for a radio-frequency receiver in the RRU based on the control instructions to receive the synchronization-assisting radio-frequency signal through the radio frequency receiver.

Embodiment 29

The method of embodiment 27 or 28, the control instructions comprising:

an instruction to set a time period of the synchronization-assisting radio-frequency signal, based on the control instructions, to use to create the information derived from the synchronization-assisting radio-frequency signal.

Embodiment 30

The method of any of embodiments 12 through 29, further comprising:

compressing a block of digital samples captured from the received synchronization-assisting radio-frequency signal to create the information derived from the synchronization-assisting radio-frequency signal.

Embodiment 31

The method of any of embodiments 17 through 30, wherein the fronthaul link is a first fronthaul link using a non-deterministic protocol, the method further comprising:

receiving uplink data from the RRU over a second fronthaul link at an intermediate device;
sending the uplink data to the BBU over the first fronthaul link;
tuning a radio-frequency receiver in the intermediate device to a carrier frequency of the synchronization-assisting radio-frequency signal;
receiving the synchronization-assisting radio-frequency signal through the radio-frequency receiver;
sending the synchronization instructions to the RRU over the second fronthaul link.

Embodiment 32

The system of embodiment 31, wherein the non-deterministic protocol comprises an internet protocol (IP).

Embodiment 33

The method of embodiment 31 or 32, wherein the RRU is a first RRU, the method further comprising:
sending the synchronization instructions to a second RRU over a third fronthaul link.

Embodiment 34

The method of embodiment 31, wherein the RRU is a first RRU, the method further comprising:
controlling a local clock of a second RRU using synchronization mechanisms of a common public radio interface (CPRI) linking the intermediate device with the second RRU.

Embodiment 35

A synchronization device comprising:
a first interface to the first fronthaul link coupled to the BBU;
a second interface to the second fronthaul link coupled to the RRU;
a processor, coupled to the first interface and the second interface; and
at least one non-transitory machine readable medium, coupled to the processor, and comprising one or more instructions that in response to being executed by the processor cause the synchronization device to carry out a method according to any one of embodiments 31 through 34;
wherein the synchronization device is the intermediate device.

Embodiment 36

An electronic device comprising:
a processor;
at least one non-transitory machine readable medium, coupled to the processor, and comprising one or more instructions that in response to being executed by the processor cause the device to carry out a method according to any one of embodiments 12 to 30; and
an interface to the fronthaul link coupled to the processor;
wherein the electronic device is the RRU in the distributed radio access network (RAN).

Embodiment 37

At least one non-transitory machine readable medium comprising one or more instructions that in response to being executed on a computing device cause the computing device to carry out a method according to any one of embodiments 12 to 34.

Embodiment 38

A method for synchronizing a remote radio unit (RRU) in a distributed radio access network (RAN), the method comprising:
receiving information derived from a synchronization-assisting radio-frequency signal over a fronthaul link from the RRU;
processing the information derived from a synchronization-assisting radio-frequency signal to determine synchronization instructions; and
using the synchronization instructions and the fronthaul link to control a local clock in the RRU.

Embodiment 39

The method of embodiment 38, further comprising:
communicating with a core network of the RAN;
performing at least a second level protocol of the RAN; and
communicating data with the RRU for communication with a wireless terminal.

Embodiment 40

The method of embodiment 39, wherein the RAN protocol comprises an Evolved Universal Terrestrial Radio Access Network (E-UTRAN),
the core network comprises an Evolved Packet Core (EPC); and
the second-level protocol comprises an E-UTRA medium access control (MAC) protocol.

Embodiment 41

The method of any of embodiments 38 through 40, wherein the fronthaul link is a synchronous fronthaul link, the method further comprising generating a clock for the fronthaul link based on the synchronization instructions.

Embodiment 42

The method of any of embodiments 38 through 41, further comprising sending the synchronization instructions to the RRU over the fronthaul link.

Embodiment 43

The method of any of embodiments 38 through 42, the RRU being a first RRU and the information being first information, the method further comprising:
receiving, from a second RRU, second information derived from the synchronization-assisting radio-frequency signal;
processing the second information; and
determining the synchronization instructions based on both the first information and the second information.

Embodiment 44

The method of any of embodiments 38 through 43, further comprising sending control instructions to a device to control at least one aspect of the synchronization-assisting radio-frequency signal transmitted by the device.

Embodiment 45

The method of embodiment 44, the at least one aspect comprising a time period of transmission, a transmission power, or a carrier frequency of the synchronization-assisting radio-frequency signal transmitted by the device.

Embodiment 46

The method of any of embodiments 38 through 45, further comprising sending control instructions to the RRU to change a frequency to use for reception of the synchronization-assisting radio-frequency signal.

Embodiment 47

The method of embodiment 46, further comprising determining the frequency based on a quality metric of the information derived from the synchronization-assisting radio-frequency signal which was received.

Embodiment 48

The method of embodiment 47, wherein the quality metric of the received information comprises a signal-to-noise ratio.

Embodiment 49

The method of any of embodiments 38 through 48, further comprising sending control instructions to the RRU to change a time period of the synchronization-assisting radio-frequency signal to use to create the information derived from the synchronization-assisting radio-frequency signal.

Embodiment 50

The method of embodiment 49, further comprising determining the time period based on a schedule of communication between the RRU and a wireless terminal.

Embodiment 51

The method of embodiment 49 or 50, further comprising determining the time period based on a schedule of communication between another RRU and a wireless terminal.

Embodiment 52

The method of any of embodiments 38 through 51, further comprising sending control instructions to the RRU to configure a schedule for communication between the RRU and a wireless terminal, the schedule selected to avoid a time period of the synchronization-assisting radio-frequency signal to use to create the information derived from the synchronization-assisting radio-frequency signal.

Embodiment 53

The method of any of embodiments 38 through 52, wherein the synchronization instructions comprise an instruction to change a frequency or a phase of the local clock.

Embodiment 54

The method of any of embodiments 38 through 53, wherein the synchronization instructions are determined based, at least in part, on a determined physical location of the RRU.

Embodiment 55

At least one non-transitory machine readable medium comprising one or more instructions that in response to being executed on a computing device cause the computing device to carry out a method according to any one of embodiments 38 to 54.

Embodiment 56

An electronic device comprising:
a processor;
at least one non-transitory machine readable medium comprising one or more instructions that in response to being executed on the processor cause the computing device to carry out a method according to any one of embodiments 38 to 54; and
an interface to the fronthaul link coupled to the processor; wherein the electronic device is the BBU in the RAN.

As used in this specification and the appended claims, the singular forms "a", "an", and "the" include plural referents unless the content clearly dictates otherwise. Thus, for example, reference to an element described as "a processor" may refer to a single processor, two processors, or any other number of processors but a reference to "a single processor" refers to only one processor. As used in this specification and the appended claims, the term "or" is generally employed in its sense including both a union operator (OR) and an intersection operator (AND), which may also be referred to as an "inclusive OR" or an "and/or" unless the content clearly dictates otherwise. As used in this specification and the appended claims, the term "coupled" includes direct and indirect connections. Moreover, where first and second devices are coupled, intervening devices, including active devices, may be located there between. As used in this specification and the appended claims, the phrase "based on" should be interpreted as being open ended, equivalent to "based, at least in part, on" and allow for the action to be based on other elements in addition to the elements specified. Unless otherwise indicated, all numbers expressing quantities of elements, percentages, and so forth used in the specification and claims are to be understood as being modified in all instances by the term "about." Interpretation of the term "about" is context specific, but in the absence of other indications, should generally be interpreted as ±10% of the modified quantity, measurement, or distance. The recitation of numerical ranges by endpoints includes all numbers subsumed within that range (e.g. 1 to 5 includes 1, 2.78, 3.33, and 5). For the purposes of any filing in the United States of America, any element in a claim that does not explicitly state "means for" performing a specified function, or "step for" performing a specified function, is not to be interpreted as a "means" or "step" clause as specified in 35 U.S.C. § 112(f).

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments, but should be defined only in accordance with the following claims and equivalents thereof.

What is claimed is:

1. A method for synchronizing a remote radio unit (RRU) in a distributed radio access network (RAN), the method comprising:
generating, at a baseband unit (BBU) in the RAN, synchronization instructions to synchronize a local clock of a synchronization device to the RAN, wherein the synchronization device is coupled to the BBU using a first fronthaul link and is coupled to the RRU using a second fronthaul link;
sending the synchronization instructions from the BBU to the synchronization device over the first fronthaul link; and
controlling a local clock of the synchronization device using the synchronization instructions; and
controlling, by the synchronization device, a local clock in the RRU using the second fronthaul link.

2. The method of claim 1, further comprising:
communicating, by the RRU, with the at least one wireless terminal using radio-frequency signals;
performing at least a first portion of a first-level protocol of the RAN within the RRU; and
communicating data of the communication with the at least one wireless terminal from the RRU over the first fronthaul link and second communication with the BBU via the synchronization device.

3. The method of claim 2, wherein the RAN protocol comprises an Evolved Universal Terrestrial Radio Access Network (E-UTRAN); and
the first-level protocol comprises an Evolved Universal Terrestrial Radio Access (E-UTRA) physical-layer (PHY) protocol.

4. The method of claim 1, wherein the second fronthaul link is a synchronous fronthaul link and the local clock in the RRU is locked to the second fronthaul link.

5. The method of claim 1, wherein the second fronthaul link uses a common public radio interface (CPRI) protocol and CPRI synchronization is used to control the local clock in the RRU.

6. The method of claim 1, further comprising:
using the synchronization instructions to control the local clock in the RRU.

7. The method of claim 6, wherein the synchronization instructions comprise an instruction to change a frequency or a phase of the local clock at least one of the synchronization device or RRU.

8. The method of claim 6, wherein the first fronthaul link is an asynchronous fronthaul link, the method further comprising adjusting the local clock in the synchronization device based on the synchronization instructions to control the local clock in the synchronization device.

9. The system of claim 8, wherein the asynchronous fronthaul link utilizes an internet protocol (IP).

10. The method of claim 1, further comprising:
receiving a synchronization-assisting radio-frequency signal through an antenna at the synchronization device; and
sending information derived from the synchronization-assisting radio-frequency signal from the synchronization device to the BBU over the first fronthaul link.

11. The method of claim 10, wherein the synchronization-assisting radio-frequency signal comprises a GPS satellite signal, a downlink signal from a cellular base station, a television broadcast signal, an uplink signal from a cellular terminal, or a time broadcast signal.

12. The method of claim 10, wherein the RRU is a first RRU and the synchronization-assisting radio-frequency signal comprises a signal from a second RRU.

13. The method of claim 12, wherein the signal from the second RRU comprises a downlink signal or a dedicated beacon signal.

14. The method of claim 10, further comprising:
receiving control instructions from the BBU over the first fronthaul link at the synchronization device; and
controlling at least one aspect of the receiving of the synchronization-assisting radio-frequency signal or the derivation of the information from the synchronization-assisting radio-frequency signal based on the control instructions.

15. The method of claim 14, the control instructions comprising:
an instruction to set a receive frequency for a radio-frequency receiver in the synchronization device based on the control instructions to receive the synchronization-assisting radio-frequency signal through the radio frequency receiver.

16. The method of claim 14, the control instructions comprising:
an instruction to set a time period of the synchronization-assisting radio-frequency signal, based on the control instructions, to use to create the information derived from the synchronization-assisting radio-frequency signal.

17. The method of claim 10, further comprising:
compressing a block of digital samples captured from the received synchronization-assisting radio-frequency signal to create the information derived from the synchronization-assisting radio-frequency signal.

18. The method of claim 1, further comprising:
receiving first fronthaul data from the BBU via the first fronthaul link using a first fronthaul protocol;
converting the first fronthaul data to second fronthaul data; and
forwarding the second fronthaul data to the RRU via the second fronthaul link using a second fronthaul protocol.

19. The method of claim 18, wherein the first fronthaul protocol comprises a fronthaul-over-internet-protocol (FIP) based fronthaul protocol and the second fronthaul protocol comprises a common public radio interface (CPRI) based fronthaul protocol.

20. A synchronization device comprising:
a processor;
a local clock coupled to the processor;
a first interface between a first fronthaul link and the processor;
a second interface between a second fronthaul link and the processor; and
at least one non-transitory machine readable medium, coupled to the processor, and comprising one or more instructions that in response to being executed by the processor cause the synchronization device to:
receive synchronization instructions from;
a baseband unit (BBU) of a distributed radio access network (RAN) using the first interface;
control the local clock of the synchronization device using the synchronization instructions; and
control a local clock in a remote radio unit (RRU) of the RAN using the second interface.

21. The synchronization device of claim 20, wherein the one or more instructions, in response to being executed by the processor, further cause the synchronization device to:
  use the synchronization instructions to control the local clock in the RRU.

22. The synchronization device of claim 20, wherein the one or more instructions, in response to being executed by the processor, further cause the synchronization device to:
  receive first fronthaul data from the BBU via the first fronthaul link using a first fronthaul protocol;
  convert the first fronthaul data to second fronthaul data; and
  forward the second fronthaul data to the RRU via the second fronthaul link using a second fronthaul protocol.

23. The synchronization device of claim 22, wherein the first fronthaul protocol comprises a fronthaul-over-internet-protocol (FIP) based fronthaul protocol and the second fronthaul protocol comprises a common public radio interface (CPRI) based fronthaul protocol.

24. At least one non-transitory machine readable medium comprising one or more instructions that in response to being executed by a processor of a synchronization device of a distributed radio access network (RAN) cause a remote radio unit (RRU) to:
  receive a synchronization instructions from a baseband unit (BBU) of the RAN using a first fronthaul link that couples the synchronization device to the BBU;
  control a local clock of the synchronization device using the synchronization instructions; and
  control a local clock in the RRU of the RAN using a second fronthaul link that couples the synchronization device to the RRU.

25. The at least one non-transitory machine readable medium of claim 24, wherein the one or more instructions, in response to being executed by the processor, further cause the synchronization device to:
  use the synchronization instructions to control the local clock in the RRU.

26. The at least one non-transitory machine readable medium of claim 24, wherein the synchronization instructions comprise an instruction to change a frequency or a phase of the local clock of the synchronization device.

27. The at least one non-transitory machine readable medium of claim 24, wherein the one or more instructions, in response to being executed by the processor, further cause the RRU to:
  receiving a synchronization-assisting radio-frequency signal through an antenna at the synchronization device; and
  sending information derived from the synchronization-assisting radio-frequency signal from the synchronization device to the BBU over the first fronthaul link.

28. The at least one non-transitory machine readable medium of claim 24, wherein the one or more instructions, in response to being executed by the processor, further cause the synchronization device to:
  receive first fronthaul data from the BBU via the first fronthaul link using a first fronthaul protocol;
  convert the first fronthaul data to second fronthaul data; and
  forward the second fronthaul data to the RRU via the second fronthaul link using a second fronthaul protocol.

29. The at least one non-transitory machine readable medium of claim 28, wherein the first fronthaul protocol comprises a fronthaul-over-internet-protocol (FIP) based fronthaul protocol and the second fronthaul protocol comprises a common public radio interface (CPRI) based fronthaul protocol.

* * * * *